United States Patent [19]
Bae et al.

[11] Patent Number: 6,130,722
[45] Date of Patent: Oct. 10, 2000

[54] CLOSED-CAPTION BROADCASTING AND DISPLAYING METHOD AND APPARATUS SUITABLE FOR SYLLABLE CHARACTERS

[75] Inventors: Jum-Han Bae, Suwon; Jin-Hwa Yang, Seoul; Hyun-Jeong Park; Byeong-Sung Cho, both of Suwon; Sang-Rok Han, Kyungki-do, all of Rep. of Korea

[73] Assignee: Samsung Electronics Co., Ltd, Suwon, Rep. of Korea

[21] Appl. No.: 08/851,720

[22] Filed: May 5, 1997

[30] Foreign Application Priority Data

May 3, 1996 [KR] Rep. of Korea ............... 96-14418
May 3, 1996 [KR] Rep. of Korea ............... 96-14436

[51] Int. Cl.⁷ ..................... H04N 5/278; H04N 5/445
[52] U.S. Cl. ............. 348/589; 348/564; 348/468
[58] Field of Search ................... 348/468, 563, 348/564, 569, 589, 600, 461, 478, 476; H04N 5/278, 5/445

[56] References Cited

U.S. PATENT DOCUMENTS 5,477,274  12/1995  Akiyoshi .................. 348/468
5,561,471  10/1996  Kim ......................... 348/565

*Primary Examiner*—Sherrie Hsia
*Attorney, Agent, or Firm*—Staas & Halsey LLP

[57] ABSTRACT

A closed-caption broadcasting and displaying method and apparatus. According to the closed-caption broadcasting method and apparatus, a caption signal including character information and control information is encoded in a scanning line of each field of a television broadcasting signal to be transmitted, which does not affect the television broadcasting signal. Control information on the writing direction and display position among the control information is repeatedly transmitted at predetermined intervals.

27 Claims, 35 Drawing Sheets

FIG. 5

| | | | | | | | | VALUES OF D12, D11, D10, D9 IN MSWORD | | | | | | | | | FUNCTION |
|---|---|---|---|---|---|---|---|---|---|---|---|---|---|---|---|---|---|
| | | 0 | 1 | 2 | 3 | 4 | 5 | 6 | 7 | 8 | 9 | A | B | C | D | E | F | |
| VALUES OF D3, D2, D1 IN LSWORD | 0 | black LTR | RED LTR | MAGENTA LTR | BLUE LTR | CYAN LTR | GREEN LTR | YELLOW LTR | WHITE LTR | BLACK GROUND | TRANSPARENT GROUND | MAGENTA GROUND | BLUE GROUND | CYAN GROUND | GREEN GROUND | YELLOW GROUND | WHITE GROUND | COLOR DESIG. |
| | 1 | ATTR. RELEASE | | | UNDER LINE DESIG. | | BLINK' DESIG. | IMAGE DESIG. | | | 2-LINE ROLL-UP (PAGE START) | 3-LINE ROLL-UP | | 4-LINE ROLL-UP | | | 5-LINE ROLL-UP | CHAR. ATTR. & ROLL-UP |
| | 2 | ON-DISPLAY | | | OFF-DISPLAY | | HOR. WRIT'G | VER. WRIT'G | | | 2-LINE ROLL-DOWN (PAGE END) | 3-LINE ROLL-DOWN | | 4-LINE ROLL-DOWN | | | 5-LINE ROLL-DOWN | DISPLAY METHOD & ROLL-DOWN |
| | 3 | APDR | | | APUR | | APF | APB | | | 3LTR APF | 4LTR APF | | 5LTR APF | | | 6LTR APF | POSITION MOVEMENT |
| | 4 | 1ST ROW | | | 2ND ROW | | 3RD ROW | 4TH ROW | | | 5TH ROW | 6TH ROW | | 7TH ROW | | | 8TH ROW | |
| | 5 | 9TH ROW | | | 10TH ROW | | 1ST COL. | 2ND COL. | | | 3RD COL. | 4TH COL. | | 5TH COL. | | | 6TH COL. | ROW & COLUMN POSITION DESIG. |
| | 6 | 7TH ROW | | | 8TH COL. | | 9TH COL. | 10TH COL. | | | 11TH COL. | 12TH COL. | | 13TH COL. | | | 14TH COL. | |
| | 7 | 15TH ROW | | | 16TH COL. | | 17TH COL. | 18TH COL. | | | RECEIVE & STORE | HOLD | | HOLD | | | HOLD | |

FIG. 6A

| UPPER | LOWER | CLASSIFICATION |
|---|---|---|
| a1<br>a2 | a0~ff | SPECIAL CHARACTER |
| a3 | ″ | NUMERAL & ENGLISH CHARACTER |
| a4 | ″ | HANGUL CHARACTER |
| a5 | ″ | GREEK |
| a6~a9 | ″ | SPECIAL CHARACTER |
| aa<br>ab | ″ | JAPANESE HIRAGANA/KATAKANA |
| ac | ″ | RUSSIAN |
| ad~af | ″ | NOT IN USE |
| b0~c9 | ″ | HANGUL |
| ca~fe | ″ | CHINESE CHARACTER |
| ff | ″ | NOT IN USE |

FIG. 6B

| UPPER | LOWER | 0 1 2 3 4 5 6 7 8 9 a b c d e f |
|---|---|---|
| a1 | a0 | ´ ˋ ¨ . …… ¨ 〃 ‐ ― ‖ \ ~ ´ ˋ |
|    | b0 | " " ( ) 〔 〕 [ ] { } 〈 〉 《 》 「 」 『 』 |
|    | c0 | ÷ ≠ ≤ ≥ ∞ ∴ ° ′ ″ ℃ Å ¢ £ ¥ ♂ ♀ |
|    | d0 | ∠ ⊥ ⌒ ∂ ∇ ≡ ≒ § ※ ☆ ★ ○ ● ◎ ◇ ◆ |
|    | e0 | □ ■ △ ▲ ▽ ▼ → ← ↑ ↓ ↔ = ≪ ≫ √ ∽ |
|    | f0 | ∝ ∵ ∫ ∬ ∈ ∋ ⊆ ⊇ ⊂ ⊃ ∪ ∩ ∧ ∨ ¬ |
| a2 | a0 | ⇒ ⇔ ∀ ∃ ´ ˜ ˇ ˘ ˝ ˙ ¸ ˛ ¡ ¿ |
|    | b0 | ː ƒ ∑ ∏ π ␣ °F ‰ ◁ ◀ ▷ ▶ ♤ ♠ ♡ ♥ ♧ |
|    | c0 | ♣ ⊙ ◈ ▣ ◐ ◑ ▒ ▤ ▥ ▨ ▩ ▧ ▦ ▩ ♨ ☏ |
|    | d0 | ☎ ☜ ¶ † ‡ ↕ ↗ ↙ ↖ ↘ ♭ ♩ ♪ ♬ ㉿ ㈜ |
|    | e0 | №㏇™㏂㏘℡ |
|    | f0 | |
| a3 | a0 | ! " # $ % & ' ( ) * + , - . / |
|    | b0 | 0 1 2 3 4 5 6 7 8 9 : ; < = > ? |
|    | c0 | @ A B C D E F G H I J K L M N O |
|    | d0 | P Q R S T U V W X Y Z [ \ ] ^ _ |
|    | e0 | ` a b c d e f g h i j k l m n o |
|    | f0 | p q r s t u v w x y z { \| } ‾ |
| a4 | a0 | ㄱ ㄲ ㄳ ㄴ ㄵ ㄶ ㄷ ㄸ ㄹ ㄺ ㄻ ㄼ ㄽ ㄾ ㄿ ㅀ |
|    | b0 | ㅁ ㅂ ㅃ ㅄ ㅅ ㅆ ㅇ ㅈ ㅉ ㅊ ㅋ ㅌ ㅍ ㅎ ㅏ |
|    | c0 | ㅐ ㅑ ㅒ ㅓ ㅔ ㅕ ㅖ ㅗ ㅘ ㅙ ㅚ ㅛ ㅜ ㅝ ㅞ ㅟ |
|    | d0 | ㅠ ㅡ ㅢ ㅣ ㅥ ㅦ ㅧ ㅨ ㅩ ㅪ ㅫ ㅬ ㅭ ㅮ |
|    | e0 | ㅯ ㅰ ㅱ ㅲ ㅳ ㅴ ㅵ ㅶ ㅷ ㅸ ㅹ ㅺ ㅻ ㅼ ㅽ ㅾ |
|    | f0 | ㅿ ㆀ ㆁ ㆂ ㆃ ㆄ ㆅ ㆆ ㆇ ㆈ ㆉ ㆊ ㆋ ㆌ · ㆍ |
| a5 | a0 | ⅰ ⅱ ⅲ ⅳ ⅴ ⅵ ⅶ ⅷ ⅸ ⅹ |
|    | b0 | Ⅰ Ⅱ Ⅲ Ⅳ Ⅴ Ⅵ Ⅶ Ⅷ Ⅸ Ⅹ |
|    | c0 | Α Β Γ Δ Ε Ζ Η Θ Ι Κ Λ Μ Ν Ξ Ο |
|    | d0 | Π Ρ Σ Τ Υ Φ Χ Ψ Ω |
|    | e0 | α β γ δ ε ζ η θ ι κ λ μ ν ξ ο |
|    | f0 | π ρ σ τ υ φ χ ψ ω |

FIG. 6C

| UPPER | LOWER | 0 1 2 3 4 5 6 7 8 9 a b c d e f |
|---|---|---|
| a6 | a0<br>b0<br>c0<br>d0<br>e0<br>f0 | ─ │ ┌ ┐ ┘ └ ├ ┬ ┤ ┴ ┼ ━ ┃ ┏ ┓<br>┛ ┗ ┣ ┳ ┫ ┻ ╋ ┠ ┯ ┨ ┷ ┿ ┝ ┰ ┥ ┸<br>╂ ┒ ┑ ┚ ┙ ┖ ┕ ┎ ┍ ┞ ┟ ┡ ┢ ┦ ┧ ┩<br>┪ ┭ ┮ ┱ ┲ ┵ ┶ ┹ ┺ ┽ ┾ ╀ ╁ ╃ ╄ ╅<br>╆ ╇ ╈ ╉ ╊ |
| a7 | a0<br>b0<br>c0<br>d0<br>e0<br>f0 | μl ml dl l kl cc mm³ cm³ m³ km³ fm nm μm mm cm<br>km mm³ cm³ m³ km³ ha μg mg kg kt cal kal dB ‰ ‱ ps<br>ns μs ms pV nV μV mV kV MV pA nA μA mA KA pW nW<br>μW nW kW MW Hz KHz MHz GHz THz Ω KΩ MΩ pF nF μFmol<br>cd rad rad² rad³ sr Pa KPa MPa GPa wb lm lx Bq Gy Sy % |
| a8 | a0<br>b0<br>c0<br>d0<br>e0<br>f0 | Æ Ð ª Ħ IJ Ŀ Ł Ø Œ º Þ Ŧ ŋ<br>㉠㉡㉢㉣㉤㉥㉦㉧㉨㉩㉪㉫㉬㉭㉮㉯<br>㉯ 라 마 바 사 아 자 차 카 타 파 하 ⓐⓑⓒ<br>ⓓⓔⓕⓖⓗⓘⓙⓚⓛⓜⓝⓞⓟⓠⓡⓢ<br>ⓣⓤⓥⓦⓧⓨⓩ①②③④⑤⑥⑦⑧⑨<br>⑩⑪⑫⑬⑭⑮ ½ ⅓ ⅔ ¼ ¾ ⅛ ⅜ ⅝ ⅞ |
| a9 | a0<br>b0<br>c0<br>d0<br>e0<br>f0 | ʷ đ · ħ i ij ĸ ŀ ŕ ø œ β ŧ ŋ<br>ŋ (ㄱ)(ㄴ)(ㄷ)(ㄹ)(ㅁ)(ㅂ)(ㅅ)(ㅇ)(ㅈ)(ㅊ)(ㅋ)(ㅌ)(ㅍ)(ㅎ)(가)<br>(나)(다)(라)(마)(바)(사)(아)(자)(차)(카)(타)(파)(하)(a)(b)(c)<br>(d)(e)(f)(g)(h)(i)(j)(k)(l)(m)(n)(o)(p)(q)(r)(s)<br>(t)(u)(v)(w)(x)(y)(z)(1)(2)(3)(4)(5)(6)(7)(8)(9)<br>(10)(11)(12)(13)(14)(15) ' ² ³ ⁴ ⁿ ₁ ₂ ₃ ₄ |
| aa | a0<br>b0<br>c0<br>d0<br>e0<br>f0 | ぁあぃいぅうぇえぉおかがきぎく<br>ぐけげこごさざしじすずせぜそぞた<br>だちぢっつづてでとどなにぬねのは<br>ばぱひびぴふぶぷへべぺほぼぽまみ<br>むめもゃやゅゆょよらりるれろゎわ<br>ゐゑをん |

FIG. 6D

| UPPER | LOWER | 0 1 2 3 4 5 6 7 8 9 a b c d e f |
|---|---|---|
| ab | a0<br>b0<br>c0<br>d0<br>e0<br>f0 | ァアィイゥウェエォオカガキギク<br>グケゲコゴサザシジスズセゼソゾタ<br>ダチヂッツヅテデトドナニヌネノハ<br>バパヒビピフブプヘベペホボポマミ<br>ムメモャヤュユョヨラリルレロヮワ<br>ヰヱヲンヴヵヶ |
| ac | a0<br>b0<br>c0<br>d0<br>e0<br>f0 | АБВГДЕЁЖЗИЙКЛМН<br>ОПРСТУФХЦЧШЩЪЫЬЭ<br>ЮЯ<br>абвгдеёжзийклмн<br>опрстуфхцчшщъыьэ<br>юя |
| ad | a0<br>b0<br>c0<br>d0<br>e0<br>f0 | NOT IN USE |
| ae | a0<br>b0<br>c0<br>d0<br>e0<br>f0 | NOT IN USE |
| af | a0<br>b0<br>c0<br>d0<br>e0<br>f0 | NOT IN USE |

FIG. 6E

| UPPER | LOWER | 0 1 2 3 4 5 6 7 8 9 a b c d e f |
|---|---|---|
| b0 | a0 | 가각간간갈갉갊감갑값갓갔강갖갗 |
| | b0 | 같갚갛개객갠갤갬갭갯갰갱갸갹갼갈 |
| | c0 | 갓걍개갠갤거걱건걷걸겁겁것겄경 |
| | d0 | 깆길겊겋게겐겔겜겝겟겠겡겨격겪견 |
| | e0 | 걸결겸겹겻겼경곁계겐겔곕곗고곡곤 |
| | f0 | 곧골곪곬곯곰곱곳공곶과곽관괄괆 |
| b1 | a0 | 괌괍괏광괘괜괠괩괬괭괴괵관괼굄 |
| | b0 | 굅굇굉교굔굘굡굣구국군굳굴굵굶굻 |
| | c0 | 굼굽굿궁궂궈궉권궐궜궝궤궷귀긱 |
| | d0 | 귈귐귑귓규균귤그극근귿글긁금급긋 |
| | e0 | 긍긔기긱긴긷길긺김깁깃깅깆깊까깍 |
| | f0 | 깎깐깔깖깜깝깟깠깡깥깨깩깬깰깸 |
| b2 | a0 | 깹깻깼깽꺄꺅꺌꺼꺽꺾껀껄껌껍껏 |
| | b0 | 껐껑께껙껜껨껫껭껴껸껼꼇꼈꼍꼐꼬 |
| | c0 | 꼭꼰꼲꼴꼼꼽꼿꽁꽂꽃꽈꽉꽐꽜꽝꽤 |
| | d0 | 꽥꽹꾀꾄꾈꾐꾑꾕꾜꾸꾹꾼꿀꿇꿈꿉 |
| | e0 | 꿋꿍꿎꿔꿜꿨꿩꽤꿱꿴꿸뀀뀁뀄뀌뀐 |
| | f0 | 뀔뀜뀝뀨끄끅끈끊끌끎끓끔끕끗끙 |
| b3 | a0 | 끝끼끽낀낄낌낍낏낑나낙낚난낟날 |
| | b0 | 낡낢남납낫났낭낮낯낱낳내낵낸낼냄 |
| | c0 | 냅냇냈냉냐냑냔냘냠냥너넉넋넌널넒 |
| | d0 | 넓넘넙넛넜넝넣네넥넨넬넴넵넷넸넹 |
| | e0 | 녀녁년녈념녑녔녕녘녜녠노녹논놀놂 |
| | f0 | 놈놉놋농높놓놔놘놜놨뇌뇐뇔뇜뇝 |
| b4 | a0 | 뇟뇨뇩뇬뇰뇹뇻뇽누눅눈눋눌눔눕 |
| | b0 | 눗눙눠눴눼뉘뉜뉠뉨뉩뉴뉵뉼늄늅능 |
| | c0 | 느늑는늘늙늚늠늡늣능늦늪늬늰늴니 |
| | d0 | 닉닌닐닒님닙닛닝닢다닥닦단닫달닭 |
| | e0 | 닮닯닳담답닷닸당닺닻닿대댁댄댈댐 |
| | f0 | 댑댓댔댕댜더덕덖던덛덜덞덟덤덥 |

FIG. 6F

| UPPER | LOWER | 0 1 2 3 4 5 6 7 8 9 a b c d e f |
|---|---|---|
| b5 | a0 | 덧덩딫덮대덱덴델뎀뎁뎃뎄뎅뎌던 |
|  | b0 | 뎔뎠뎡뎨덴도독돈돋돌돎돐돔돕돗동 |
|  | c0 | 돚돝돠돤돨돼됐되된될됨됩됫됴두둑 |
|  | d0 | 둔둘둠둡둣둥뒤뒈뒝뒨뒨뷜륍뒷빙 |
|  | e0 | 듀둰뒬듐듕드득든들듦듬듭듯등듸 |
|  | f0 | 디닥딘닫딜딤딥딧딨딩딪따딱딴딸 |
| b6 | a0 | 땀땁땃땄땅땋때떡땐땔땜땝땟땠땡 |
|  | b0 | 떠떡떤떨떪떫떱떳떴떵떻떼떽덴뗄 |
|  | c0 | 뗌뗍뗏뗐뗑뗘떴도똑똔똘똥똬똴뙈뙤 |
|  | d0 | 된뚜뚝뚠뚤뚫뚬뚱뛔뛰뛴뛸띔띕띵뜨 |
|  | e0 | 똑뜬뜯뜰뜸뜹뜻띄띈띌띔띕띠띤띨띰 |
|  | f0 | 띱띳띵라락란랄람랍랏랐랑랒랖랗 |
| b7 | a0 | 래랙랜랠램랩랫랬랭랴락란랕량러 |
|  | b0 | 럭런럴럼럽럿렀렁렇레렉렌렐렘렙렛 |
|  | c0 | 렝려력련렬렴렵렷렸령례롄롑롓로록 |
|  | d0 | 론롤롬롭롯롱롸뢀룅뢰뢴뢸룀룁룃 |
|  | e0 | 룅료룐룔룝룟룡루룩룬룰룸룹룻룽뤄 |
|  | f0 | 뤘뤠뤼뤽륀륄륌륏륑류륙륜률륨륩 |
| b8 | a0 | 륫륭르륵른를름릅릇릉릊릍릏리릭 |
|  | b0 | 린릴림립릿링마막만많맏말맑맘맙 |
|  | c0 | 맛망맞맡맣매맥맨맬맴맵맷맸맹맺먀 |
|  | d0 | 먁먈먕머먹먼멀멂멈멉멋멍멎멓메멕 |
|  | e0 | 멘멜멤멥멧멨멩며멱면멸몃몄명몇예 |
|  | f0 | 모목몫몬몰몲몸몹못몽뫄봤뫙뫼 |
| b9 | a0 | 묀묄묍묏묑묘묜묠묩묫무묵묶문묻 |
|  | b0 | 물묽묾뭄뭅뭇뭉뭍뭏뭐뭔뭘뭥뭬뮈 |
|  | c0 | 뮌뮐뮤뮨뮬뮴뮷므믄믈믐믓미믹민믿 |
|  | d0 | 밀밂밈밉밋밌밍및밑바박밖밗반받발 |
|  | e0 | 밝밞밟밤밥밧방밭배백밴밸뱀뱁뱃뱄 |
|  | f0 | 뱅뱉뱌뱍뱐뱝버벅번벋벌벎범법벗 |

FIG. 6G

| UPPER | LOWER | 0 1 2 3 4 5 6 7 8 9 a b c d e f |
|---|---|---|
| ba | a0 | 빙빛배백벤벤벨벰벱벳벴벵벼벽변 |
|    | b0 | 별볌볏볐병볕볘볜보복볶본볼봄봅봇 |
|    | c0 | 봉봐봔봤봬뵀뵈뵉뵌뵐뵘뵙뵤본부복 |
|    | d0 | 분붇불붉붊붐붑붓붕붙붚붜붤붰붸뷔 |
|    | e0 | 뷕뷘뷜븅뷰뷴뷸븀븃븅브복븐블븜븝 |
|    | f0 | 븟비빅빈빌빎빔빕빗빙빚빛빠빡빤 |
| bb | a0 | 빨빪빰빱빳빴빵빼빽뺀뺄뺌뺍뺏 |
|    | b0 | 뺐뺑뺘빡뺨뼁뼉뼌뼏뼐뼘뼛뼜뼝뼤뼹 |
|    | c0 | 뼈뼉뼘뼙뼛뼜뼁뽀뽁뽄뽈뽐뽑뽕뽜뽨 |
|    | d0 | 뽱뿌뿍뿐뿔뿜뿟뿡뿨뿽쁘쁜쁠쁨쁩삐 |
|    | e0 | 삑삔삘삠삡삣삥사삭산샅살삵삶삼 |
|    | f0 | 삽삿샀상샅새색샌샐샘샙샛샜생샤 |
| bc | a0 | 샥샨샬샴샵샷상새샌샐샘생서석섞 |
|    | b0 | 섟선섣설섧섬섭섯섰성섶세섹센셀 |
|    | c0 | 셈셉셋셌셍셔셕션셜셤셥셧셨셩셰셴 |
|    | d0 | 셸솅소속솎손솔솖솜솝솟송솥솨솩솬 |
|    | e0 | 솰솽쇄쇈쇌쇔쇗쇘쇠쇤쇨쇰쇱쇳쇼속 |
|    | f0 | 손솔솜솝솟송수숙순숟술숨숩숫숭 |
| bd | a0 | 숯숱숲쉬쉈쉐쉑쉔쉘쉠쉥쉬쉭쉰쉴 |
|    | b0 | 쉼쉽쉿슁슈숙슐슘슛슝스슥슨슬슭슴 |
|    | c0 | 습슷승시식신싣실싫심십싯싱싶싸싹 |
|    | d0 | 싼쌀쌈쌉쌌쌍쌓쌔쌕쌘쌜쌤쌥쌨쌩 |
|    | e0 | 썅써썩썬썰썲썸썹썼썽쎄쎈쎌쏀소속 |
|    | f0 | 손쏟쏠쏢쏨쏩쏭쏴쏵쏸쐈쐐쐤쐬쐰 |
| be | a0 | 쐴쐼쐽쑈수쑥쑨쑬쑴쑵쑹쒀쒔쒜쒸 |
|    | b0 | 쒼쓩쓰쓱쓴쓸쓺쓿씀씁씌씐씔씜씨씩 |
|    | c0 | 씬씰씸씹씻씽아악안앉않알앍앎앓암 |
|    | d0 | 압앗았앙앝앞애액앤앨앰앱앳앴앵야 |
|    | e0 | 약얀얄얇얌얍얏양얕얗얘얜얠얩어억 |
|    | f0 | 언얹얼얽얾엄업없엇었엉엊엌엎 |

FIG. 6H

| UPPER | LOWER | 0 1 2 3 4 5 6 7 8 9 a b c d e f |
|---|---|---|
| bf | a0 | 에엑엔엘엠엡엣엥어역엮언얼읽읽 |
|  | b0 | 엽업없엇었영옅옆옇에앤엘엠엡엣엤 |
|  | c0 | 오옥온올옮옯옰옴옵옷옹옻와왁완 |
|  | d0 | 왈왐왑왓왔왕왜왝왠웸왯왱외왹왼월 |
|  | e0 | 윔윕윗윙요욕욘율음웁웃웅우욱운울 |
|  | f0 | 욺욻움웁웃웅위윅원월윔윗윘윙웨 |
| c0 | a0 | 웩웬웰웸웹웽위윅윈윌윔윕윗윙유 |
|  | b0 | 육윤율윰윱웃융윶으윽은을읊음읍웃 |
|  | c0 | 응읏읒읔을읊응의윈월윔윗이익인잎 |
|  | d0 | 읽읾잃임입잇있잉잊잎자작잔잖잗질 |
|  | e0 | 잚잠잡잣잤장잦재잭잰잴잼잽잿쟀쟁 |
|  | f0 | 쟈작쟌쟎쟐쟘쟝재잰잴저적전절젎 |
| c1 | a0 | 점접젓정젖제젝젠젤젬젭젯젱져젼 |
|  | b0 | 졀졈졉졌졍제조족존줄줌좀좁좃종좇 |
|  | c0 | 좆종좌곽활찹찻장채쇘쎙죄쥔쥘쥐 |
|  | d0 | 쥣정죠족존종주축준줄줆줌줍줏중 |
|  | e0 | 줘줬줴쥐릭쥔질침집췻쥬쥰줄줍즈측 |
|  | f0 | 즌줄즘즙즛중지직진진질짊잠집짓 |
| c2 | a0 | 징짖질짊짜작잔잖짤짧잠잡잣짰찡 |
|  | b0 | 재잭잰쨀쨈쨉쨋쨌쨍쟈잔쨩쩌쩍쩐절 |
|  | c0 | 쩜쩝쩟쩠쩡쩨쩽쩌졌조쫀쫄쫌쏩쫏 |
|  | d0 | 종쫓좌꽉쫠쫬쫬죄쮜쩔쭘쭙쫑주쭉 |
|  | e0 | 준쭐쭘쭙쭝쭤쮔찡쮜쮸쯔쯤쯧쯩찌씩 |
|  | f0 | 찐찔찜찝찡찢찧차착찬찮찰참찹찻 |
| c3 | a0 | 찼창찾채책챈챌챔챕챗챘챙챠챤챵 |
|  | b0 | 챨챰챵처척천철첨첩첫첬청체책첸첼 |
|  | c0 | 챔챕챗챙처천촷체첸챙초촉촌출촘추 |
|  | d0 | 촛총촤촨활최쵠쵤쵬쵭쵯청쵸춈추 |
|  | e0 | 축춘출춤춥춧충춰췄췌췐취췬췰췸췹 |
|  | f0 | 췻청츄츈출츔층츠측츤츨츰츱츳층 |

FIG. 61

| UPPER | LOWER | 0 1 2 3 4 5 6 7 8 9 a b c d e f |
|---|---|---|
| c4 | a0 | 치칙친친칠칠힘침침칫칭카칵칸칼캄 |
|  | b0 | 캅캇캉케캑켄켈켐켑켓켔켕캬캭캉커 |
|  | c0 | 칵킨킬킴킵킷컸킹캐켁켄켈켐켑켓 |
|  | d0 | 캥커컨컬컴컵컷컸경케코콕콘골콤콥 |
|  | e0 | 콧콩콰콱콴콸쾀쾅쾌쾡쾨쾰코쿠쿡쿤 |
|  | f0 | 쿨쿰쿱쿳쿵퀴퀸퀼큉퀘퀭키킥킨킬 |
| c5 | a0 | 킴킵킷킹큐쿤큘큠크큭큰클큼큽킁 |
|  | b0 | 키킥킨킬킴킵킷킹타탁탄탈탉탐탑탓 |
|  | c0 | 탔탕태택탠탤탬탭탯탰탱탸탕터턱턴 |
|  | d0 | 털턻텀텁텃텄텅테텍텐텔템텝텟텡벼 |
|  | e0 | 턴턌테텐토톡톤톨톰톱톳통톺퇴퇀퉤 |
|  | f0 | 퇴퇸툇툉툐투툭툰툴툼툽툿퉁튀퉜 |
| c6 | a0 | 퉤튀퉉퉌튈튐튑퉁튜튠튤튬퉁트특 |
|  | b0 | 튼튿틀틂틈틉틋틔튄틜틤틉티틱탄틸 |
|  | c0 | 틈팁팃팅파팍퐈판퐌퐒팜팝팟퐜팡팔 |
|  | d0 | 패팩팬팰팸팹팻팼팽퐈팍퍼퍽펀펄펌 |
|  | e0 | 컵핏핐핑페펙펜펠펨펩펫펭펴편펼펌 |
|  | f0 | 펌펐평폐펠폽폣포폭폰폴폼폽폿퐁 |
| c7 | a0 | 퐈퐝푀푄표푠퓰퓸풋푸푹푼푿풀품 |
|  | b0 | 품풉풋풍풔퓡퓌퓐퓔퓜퓟퓨퓬퓰퓸풋 |
|  | c0 | 퓽프픈플픔픕픗피픽핀필핌핍핏핑하 |
|  | d0 | 학한할핥함합핫항해핵핸헬햄햅햇했 |
|  | e0 | 행햐향히헉헌힐흽험험헛형해헥헨헬 |
|  | f0 | 헴헵헷헹허혁헌혈험헙헛헜형헤헨 |
| c8 | a0 | 헬헵호혹혼홀홅홈홉홋홍홑화확환 |
|  | b0 | 활홧황홰홱홴홼횃회획횐횔횝횟횡효 |
|  | c0 | 횬횰흄홋후훅훈훌훑훔훕훗훙훠훤훨 |
|  | d0 | 횡훼휙휀휄휑휘휙휜휠휨휩휫횡휴흌 |
|  | e0 | 휸휼흄흇흉흐흑흔흖흘흙흠흡흣흥 |
|  | f0 | 홑희흰흴흼흽횟히힉힌힐힘힙힛힝 |

FIG. 6J

| UPPER | LOWER | 0 1 2 3 4 5 6 7 8 9 a b c d e f |
|---|---|---|
| c9 | a0<br>b0<br>c0<br>d0<br>e0<br>f0 | USER'S<br>DEFINITION REGION<br>FOR HANGUL |
| ca | a0<br>b0<br>c0<br>d0<br>e0<br>f0 | 伽佳假價加可呵哥嘉嫁家暇架枷柯<br>歇珂痂榎苛茄街袈訶賈跏軻迦駕刻卻<br>各恪慤殼珏脚覺角閣侃刊墾奸姦干幹<br>懇揀杆柬桿澗癇看磵稈竿簡肝艮艱諫<br>間乫喝曷渴碣竭葛褐蝎鞨勘坎堪嵌感<br>憾戡敢柑橄減甘疳監瞰紺邯鑑鑒龕 |
| cb | a0<br>b0<br>c0<br>d0<br>e0<br>f0 | 匣岬甲胛鉀閘剛堈姜岡崗康强彊慷<br>江疆糠絳綱羌腔舡薑襁講鋼降鱇介<br>价個凱塏愷恝概改槪溉疥芥持茛箇<br>豈鎧開喀客坑更梗羹醵居去居巨拒据<br>據擧渠炬祛距踞車遽鉅鋸乾件健巾建<br>愆楗腱虔鍵騫乞傑杰桀儉劍劒檢 |
| cc | a0<br>b0<br>c0<br>d0<br>e0<br>f0 | 瞼鈐黔劫怯迲偈憩揭擎格檄激膈覡<br>隔堅牽犬甄絹繭肩見譴遣鵑抉決潔結<br>缺訣兼慊箝謙鉗鎌京俓倞傾儆勁勍卿<br>坰境庚徑慶憬擎敬景暻更梗涇炅烱璟<br>璥瓊痙硬磬竞競綱經耕耿脛莖警輕逕<br>鏡頃頸驚鯨係啓堺契季屆悸戒桂械 |
| cd | a0<br>b0<br>c0<br>d0<br>e0<br>f0 | 棨溪界癸磎稽系繫繼計誡谿階鷄古<br>叩告呱固姑孤尻庫拷攷故敲暠枯槁沽<br>痼皐睾稿羔考股蠱苦菰菇藁蔍栲誥賈<br>辜錮雇顧高鼓哭斛曲梏穀谷鵠困坤崑<br>昆梱棍滾琨袞鯤汨滑骨供公共功孔工<br>恐恭拱控攻珙空蚣貢鞏串寡戈果瓜 |

FIG. 6K

| UPPER | LOWER | 1 2 3 4 5 6 7 8 9 a b c d e f |
|---|---|---|
| ce | a0 | 科菓誇課跨過鍋顆廓槨薔郭串冠官 |
|    | b0 | 寬慣棺款灌琯瓘管罐菅觀貫關館刮恝 |
|    | c0 | 括适侊光匡壙廣曠洸珖筐胱鑛卦 |
|    | d0 | 掛罫乖傀塊壞怪愧拐槐魁宏紘肱轟交 |
|    | e0 | 僑咬喬嬌嶠巧攪敎校橋狡皎矯較翹膠 |
|    | f0 | 蕎蛟較轎郊餃驕鮫丘久九仇俱具勾 |
| cf | a0 | 區口句咎嘔坵垢寇嶇廏懼拘敎枸柩 |
|    | b0 | 構歐毆毬求溝灸狗玖球瞿矩絿耈臼 |
|    | c0 | 舅舊苟衢謳購軀述邱鉤銶駒驅鳩鷗龜 |
|    | d0 | 國局菊鞠鞫麴君窘群裙軍郡堀屈掘窟 |
|    | e0 | 宮弓穹窮芎躬倦券勸卷圈拳捲權淃眷 |
|    | f0 | 厥獗蕨蹶闕机櫃潰詭軌饋句晷鱖貴 |
| d0 | a0 | 鬼龜叫圭奎揆槻珪硅窺竅糾葵規赳 |
|    | b0 | 逵閨勻均畇筠菌鈞龜橘克剋劇戟棘 |
|    | c0 | 隙僅劤勤懃斤根槿瑾筋芹菫覲謹近饉 |
|    | d0 | 契今妗擒昑檎琴禁禽芩衾衿襟金錦伋 |
|    | e0 | 及急扱汲級給亘兢矜肯企伎其冀嗜器 |
|    | f0 | 圻基埼夔奇妓寄岐崎己幾忌技旗旣 |
| d1 | a0 | 朞期杞棋棄機欺氣汽沂淇琪琦琪璣 |
|    | b0 | 璂畸畿碁磯祁祇祈祺箕紀綺羈耆肌 |
|    | c0 | 記譏豈起錡錤飢饑騎騏驥麒緊佶吉拮 |
|    | d0 | 桔金喫儺喇奈娜懦拏拿癩羅蘿螺裸 |
|    | e0 | 邏那樂洛烙珞落諾酪駱亂卵暖欄煖爛 |
|    | f0 | 蘭難鸞捏捺南嵐枏楠湳濫男藍襤拉 |
| d2 | a0 | 納臘蠟衲囊娘廊朗浪狼郎乃來內奈 |
|    | b0 | 柰耐冷女年撚秊念恬拈捻寧嚀努勞奴 |
|    | c0 | 弩怒撈櫓爐瑙盧老蘆虜路露駑魯鷺碌 |
|    | d0 | 祿綠菉錄鹿論壟弄濃籠聾膿農惱牢磊 |
|    | e0 | 腦賂雷尿壘樓淚漏累縷陋嫩訥杻紐 |
|    | f0 | 勒肋凜凌稜綾能菱陵尼泥匿溺多茶 |

FIG. 6L

| UPPER | LOWER | 0 1 2 3 4 5 6 7 8 9 a b c d e f |
|---|---|---|
| d3 | a0 | 丹亶但單圍壇彖斷旦檀段溜短端箪 |
| | b0 | 緞蛋袒鄲鍛檀檀籟疽達噠坍憺擔昜淡 |
| | c0 | 湛潭澹痰聃膽萏蕈談譚錟沓畓畣踏遝 |
| | d0 | 唐堂塘幢憧撞棠當糖螳黨代俗垈大對 |
| | e0 | 岱帶待戴擡玳臺袋貸隊黛宅德悳倒刀 |
| | f0 | 到圖堵途導屠島嶋度徒悼挑掉搗桃 |
| d4 | a0 | 棹櫂淘渡滔濤燾盗睹禱稻萄祝賭跳 |
| | b0 | 蹈逃途道都鍍陶韜毒瀆牘犢獨督禿篤 |
| | c0 | 纛讀墩惇敦旽暾沌焞燉豚頓乭突仝冬 |
| | d0 | 凍動同憧東桐棟洞潼疼瞳童胴蕫銅兜 |
| | e0 | 斗杜枓痘竇荳讀豆逗頭屯臀芚遁遯鈍 |
| | f0 | 得嶝橙燈登等藤謄鄧騰喇懶拏癩羅 |
| d5 | a0 | 蘿螺裸邏樂洛烙珞絡落諾酪駱丹亂 |
| | b0 | 卵欄欒瀾爛蘭鸞剌辣嵐擥攬欖灠籃纜 |
| | c0 | 藍襤寬拉臘蠟廊朗浪狼琅瑯螂郎來唻 |
| | d0 | 徠萊冷掠略亮倆兩凉梁樑粮梁糧良諒 |
| | e0 | 輛量侶儷勵呂廬慮戾旅櫚濾礪藜蠣間 |
| | f0 | 驢驪麗黎力曆歷瀝礫轢霹攣戀攣涎 |
| d6 | a0 | 煉璉練聯蓮輦連鍊列劣洌烈裂廉 |
| | b0 | 斂殮濂簾獵令伶囹寧岺嶺怜玲答羚翎 |
| | c0 | 聆逞鈴零靈領齡例澧禮醴隷勞怒撈擄 |
| | d0 | 櫓潞濾爐盧老蘆虜路輅露魯鷺鹵碌祿 |
| | e0 | 綠菉錄鹿麓論塁弄朧瀧瓏龍壟儡瀨年 |
| | f0 | 磊賂資賴雷了僚寮廖料燎療瞭聊蓼 |
| d7 | a0 | 遼闖龍壘婁屢樓涙漏瘻累縷蔞褸鏤 |
| | b0 | 陋劉旒柳榴流溜瀏琉瑠留瑠硫謬類六 |
| | c0 | 戮陸侖倫崙淪綸輪律慄栗率隆肋凜 |
| | d0 | 凌楞棱綾陵俚利厘吏唎履悧李梨浬 |
| | e0 | 犁狸理璃異痢籬罹羸莉裏裡里鱉離鯉 |
| | f0 | 吝潾燐璘藺躪隣鱗麟林淋琳臨砬砬 |

FIG. 6M

| UPPER | LOWER | 0 1 2 3 4 5 6 7 8 9 a b c d e f |
|---|---|---|
| d8 | a0 | 立笠粒摩瑪瑯碼磨馬魔麻寞幕漠膜 |
|  | b0 | 莫邈万卍娩楙彎慢挽晚曼滿漫澫瞞萬 |
|  | c0 | 蔓蠻輓饅鰻乜抹末沫茉襪靺亡妄忘忙 |
|  | d0 | 望網罔芒茫莽輞邙埋妹媒寐昧枚梅 |
|  | e0 | 煤罵買賣邁魅脈貊陌驀麥孟氓猛盲盟 |
|  | f0 | 萌冪覓免冕勉棉沔眄眠綿緬面麵滅 |
| d9 | a0 | 蔑冥名命明暝椧溟皿瞑茗蓂酩銘 |
|  | b0 | 鳴袂侮冒募姆帽慕摸摹暮某模母毛牟 |
|  | c0 | 牡瑁眸矛耗芼茅謀謨貌木沐牧目睦穆 |
|  | d0 | 鶩歿沒夢朦蒙卯墓妙廟描昴杳渺猫竗 |
|  | e0 | 苗錨務巫憮懋戊拇撫无楙武母無珷畝 |
|  | f0 | 繆舞茂蕪誣貿霧鵡墨默們刎吻問文 |
| da | a0 | 汶紊紋聞蚊門雯勿沕物味媚尾嵋彌 |
|  | b0 | 微未梶楣渼湄眉米美薇謎迷靡黴岷悶 |
|  | c0 | 愍憫敏旻旼民泯玟珉緡密蜜謐剝博 |
|  | d0 | 拍搏撲朴樸泊珀璞箔粕縛膊舶薄迫雹 |
|  | e0 | 駁伴半反叛拌搬攀斑槃泮潘班畔瘢盤 |
|  | f0 | 盼磐磻礬絆般蟠返頒飯勃拔撥渤潑 |
| db | a0 | 發跋醱鉢髮魃做傍坊妨尨幇彷房放 |
|  | b0 | 方旁防枋榜滂磅紡肪膀舫芳蒡蜂訪謗 |
|  | c0 | 邦防龐倍俳北培徘拜排杯湃焙盃背胚 |
|  | d0 | 裴裵褙賠輩配陪伯佰帛柏栢白百魄幡 |
|  | e0 | 樊煩燔番磻繁蕃飜伐筏罰閥凡帆梵 |
|  | f0 | 氾汎泛犯範范法琺僻劈壁擘璧癖 |
| dc | a0 | 碧蘗闢霹便卞弁變辨辯邊別瞥鱉鼈 |
|  | b0 | 丙倂兵屏幷炳柄棅炳甁病秉竝輧餠 |
|  | c0 | 騈保堡報寶普步洑湺潽珤甫補菩褓譜 |
|  | d0 | 輔伏僕匐卜宓復服福腹茯蔔複覆輹輻 |
|  | e0 | 馥鰒本乶俸奉封峯峰捧棒烽熢琫縫蓬 |
|  | f0 | 蜂逢鋒鳳不付俯傅剖副否咐埠夫婦 |

FIG. 6N

| UPPER | LOWER | 0 1 2 3 4 5 6 7 8 9 a b c d e f |
|---|---|---|
| dd | a0<br>b0<br>c0<br>d0<br>e0<br>f0 | 孚孵富府復扶敷斧浮溥父符簿伏腐<br>腑腐艀芙莩訃負賦賻赴趺部釜阜附駙<br>鳧北分吩噴墳奔憤念憤扮吩汾焚盆粉<br>糞紛芬賁雰不佛弗彿崩朋棚硼繃鵬<br>丕備匕匪妃婢庇悲憊扉批斐枇榧比<br>毖毗毘沸泌琵痺砒碑秕秘粃緋翡肥 |
| de | a0<br>b0<br>c0<br>d0<br>e0<br>f0 | 脾臂菲蜚裨誹譬費鄙非飛鼻嚬嬪彬<br>斌檳殯浜濱瀕牝玭貧賓頻馮氷聘騁乍<br>事些仕伺似使俟僿史司唆嗣四士奢娑<br>寫寺射巳師徙思捨斜斯柶查梭死沙泗<br>渣瀉獅砂社祀祠私篩紗絲肆舍莎蓑蛇<br>裟詐詞謝賜敎辭邪飼駟麝削數朔索 |
| df | a0<br>b0<br>c0<br>d0<br>e0<br>f0 | 傘刪山散汕珊産疝算蒜酸霰乷撒殺<br>煞薩三參杉森滲芟蔘衫揷澁鈒颯上傷<br>像償商喪嘗孀尙峠常床庠廂想桑橡湘<br>爽牀狀相祥翔裳觴詳象賞霜塞璽賽<br>嗇塞穡索色牲生甥省笙墅嶼序庶徐<br>恕抒捿敍曙書栖棲犀瑞筮絮緖署 |
| e0 | a0<br>b0<br>c0<br>d0<br>e0<br>f0 | 胥舒薯西誓逝鋤黍鼠夕奭席惜昔析<br>晳汐淅潟石碩蓆釋錫仙僊先善嬋宣扇<br>敾旋渲煽琁瑄璇璿癬禪線繕羨腺膳船<br>薛蟬詵跣選銑鐥饍鮮卨屑楔泄洩渫舌<br>薛褻設說雪齧剡暹殲纖譫贍閃陝攝涉<br>燮葉城姓宬性惺成星晟猩珹盛省筬 |
| e1 | a0<br>b0<br>c0<br>d0<br>e0<br>f0 | 聖聲腥誠醒世勢歲洗稅笹細說貰召<br>嘯塑宵小少巢所掃搔昭梳沼消溯瀟炤<br>燒甦疏疎瘙笑篠簫素紹蔬蕭蘇訴逍遡<br>邵銷韶騷屬束涑粟續謖贖速俗偶<br>孫巽飡率宋悚松淞誦送頌刷殺灑碎<br>鎖衰釗修受嗽囚乖壽嫂守岫峀帥愁 |

FIG. 60

| UPPER | LOWER | 0 1 2 3 4 5 6 7 8 9 a b c d e f |
|---|---|---|
| e2 | a0 | 成手授搜收敲樹殊水洙漱燧狩獸珠 |
|    | b0 | 璇瘦睡秀穂竪粹綏綬繻羞修叟寇蒐藪 |
|    | c0 | 袖誰讐輯遂遼酬銖銹隋隧隨雖需須首 |
|    | d0 | 髄鬚叔塾夙孰宿淑濟熟琡璹盚菽巡徇 |
|    | e0 | 循恂旬枸楯榫殉洵淳珣盾瞬筍純脣舜 |
|    | f0 | 荀蓴蕣詢諄錞順駉戌術述銃朮松 |
| e3 | a0 | 嵩瑟膝尐濕拾習褶襲丞乘俉勝升承 |
|    | b0 | 昇繩蠅陞侍匙嘶始媤尸屎屍市弑恃施 |
|    | c0 | 是時枾柴猜矢示翅蒔蓍視試詩諡豕豺 |
|    | d0 | 埴寔式息拭植殖湜熄篒蝕識軾食飾伸 |
|    | e0 | 侁信呻娠宸慎新晨燼申神紳腎臣莘薪 |
|    | f0 | 藎蜃訊身辛辰迅失室實悉審尋心沁 |
| e4 | a0 | 沈深瀋甚芯諶什十拾雙氏亞俄兒啞 |
|    | b0 | 娥峨我牙芽莪蛾衙訝阿雅餓鴉鵝堊岳 |
|    | c0 | 嶽幄惡愕握樂渥鄂鍔顎鰐鱷安岸按晏 |
|    | d0 | 案眼雁鞍顏鮟幹謁軋閼唵岩巖庵暗癌 |
|    | e0 | 菴闇壓押狎鴨仰央怏昻殃秧鴦哀埃 |
|    | f0 | 崖愛曖涯碍艾隘靄厄扼掖液縊腋額 |
| e5 | a0 | 櫻罌鶯鸚也倻冶夜惹揶椰爺耶若野 |
|    | b0 | 弱掠略約若葯蒻藥躍亮倆兩凉壤孃惡 |
|    | c0 | 揚攘敭暘梁楊樣洋漾煬痒瘍禳穰糧羊 |
|    | d0 | 良襄諒讓釀陽量養圄御於漁瘀禦語馭 |
|    | e0 | 魚齬億憶抑檍臆偃堰彦焉言諺孼蘖俺 |
|    | f0 | 儼嚴奄掩淹嶪業円予余勵呂女如廬 |
| e6 | a0 | 旅歟汝濾璵礖礪與輿茹轝閭餘驪 |
|    | b0 | 鸝黎亦力域役易曆歷疫繹譯櫟逆驛嚥 |
|    | c0 | 堧妍娟宴年延憐戀捐挺撚椽沇沿涎涓 |
|    | d0 | 淵演漣烟然煙煉燃燕璉硏硯秊筵緣練 |
|    | e0 | 縯聯衍軟輦輾鉛鍊鳶列劣咽悅涅烈 |
|    | f0 | 熱裂說閱厭廉念捻染殮炎焰琰艶苒 |

FIG. 6P

| UPPER | LOWER | 0 1 2 3 4 5 6 7 8 9 a b c d e f |
|---|---|---|
| e7 | a0 | 簾闌篶鹽曄獵燁葉令囹塋寧領嶺嶸影 |
| | b0 | 恰映暎橪榮永泳渶穎瀯濚瀅瑩鷖玲 |
| | c0 | 瑛鹲遹盈穎櫻怜聆英詠迎鈴鍈䰯䥩羚 |
| | d0 | 領乂倪例刈叡曳泥濊猊睿穢芮蘂藝禮 |
| | e0 | 裔詣譽豫醴銳隸霓預五伍俉午吾吳 |
| | f0 | 嗚塢墺奧娛寤悟惡懊敖旿晤梧汚澳 |
| e8 | a0 | 烏熬獒筽蜈誤繁鼇屋沃獄玉鈺溫瑥 |
| | b0 | 瘟穩縕蘊兀壅擁瓮甕癰翁邕雍饔渦瓦 |
| | c0 | 窩窪臥蛙蝸訛婉完宛梡椀浣玩琓琬碗 |
| | d0 | 緩翫脘腕莞豌阮頑曰往旺枉汪王倭娃 |
| | e0 | 歪矮外嵬巍猥畏了僚僥凹堯天妖姚寥 |
| | f0 | 寮尿嶢拗擾撓料曜樂橈燎燿瑤療 |
| e9 | a0 | 窈窯繇繞耀腰蓼蟯要謠遙遼邀饒 |
| | b0 | 慾欲浴縟褥辱俑傭冗勇埇墉容庸慂榕涌 |
| | c0 | 湧溶熔瑢用甬聳茸蓉踊鎔鏞龍于佑偶 |
| | d0 | 優又友右宇寓尤愚憂旴牛玗瑀盂祐禑 |
| | e0 | 禹紆羽芋藕虞迂遇郵釪隅雨雩勖嗢旭 |
| | f0 | 昱栯煜稶郁項云暈橒殞澐熉耘芸蕓 |
| ea | a0 | 運隕蕓韻蔚鬱亏熊雄元原員圓園垣 |
| | b0 | 媛嫄寃怨愿援沅洹湲源爰猿瑗苑袁轅 |
| | c0 | 遠阮院願鴛月越鉞位偉僞危圍委威尉 |
| | d0 | 慰暐渭爲瑋緯胃萎葳蝟衛褘韋魏 |
| | e0 | 魏乳侑儒兪劉唯喩孺宥幼幽庾悠惟愈 |
| | f0 | 愉揄攸有杻柔柚柳楡楢油洧流游溜 |
| eb | a0 | 濡猶猷琉瑜由留癒硫紐維臾萸裕誘 |
| | b0 | 諛諭踰蹂逾遺酉釉鍮類六堉戮毓肉 |
| | c0 | 育陸倫允玧胤尹奫潤泣玧䪨鈗閏䪼 |
| | d0 | 律慄栗率戎瀜絨融隆垠恩慇殷誾銀隱 |
| | e0 | 乙吟淫蔭陰音飮揖泣邑凝應膺鷹依倚 |
| | f0 | 儀宜意懿擬椅毅疑矣義艤薏蟻衣誼 |

FIG. 6Q

| UPPER | LOWER | 0 1 2 3 4 5 6 7 8 9 a b c d e f |
|---|---|---|
| ec | a0 | 護醫二以伊利吏夷姨履已弛彝怡易 |
|  | b0 | 李痢泥爾珥理異痍痢移罹而耳肄苡飴 |
|  | c0 | 異裡咿貳邇里離飴伺匠溺溢盜翊翌翼 |
|  | d0 | 證人仁刃印咨咽因姻寅引忍湮婣璘絪 |
|  | e0 | 茵馴蚓認隣初靷鱗麟一佚份壹日澄逸 |
|  | f0 | 鎰馹任壬妊姙恁林淋稔臨荏賃入廾 |
| ed | a0 | 立笠粒仍剩孕芿仔刺咨柿套子字孜 |
|  | b0 | 恣慈滋炙煮妓瓷疵磁紫者自茨蔗藉諸 |
|  | c0 | 資雌作勺嚼斫昨灼炸爵綽勺酌雀鵲房 |
|  | d0 | 棧殘孱蓋岑暫潛箴簪醬雜丈仗匠場墻 |
|  | e0 | 壯奬將帳庄張樟暲杖樟檣漿糚狀獐 |
|  | f0 | 璋章粧腸臟戕莊葬蔣薔藏裝贓醬長 |
| ee | a0 | 障再哉在宰才材栽梓滓滓災縡裁財 |
|  | b0 | 載齋齎爭箏諍錚佇低儲咀姐底抵杵楮 |
|  | c0 | 樗沮渚狙猪疽箸紵苧菹藷詛貯躇邇 |
|  | d0 | 邸雎顴勛吊嫡寂摘敵滴狄炙的積籍 |
|  | e0 | 績翟荻謫賊赤跡蹟迪迹適鏑佃佺傳全 |
|  | f0 | 典前剪塡塼奠專展廛悛戰栓殿氈澱 |
| ef | a0 | 煎琠田甸畑癜筌箋箭篆纏詮輾銓 |
|  | b0 | 銓錢鐫電顚顫餞切截折晢竊癤節絶占 |
|  | c0 | 岾店漸点粘霑鮎點接摺蝶丁井亭停偵 |
|  | d0 | 呈姃定幀庭廷征情挺政整旌晶晸柾楨 |
|  | e0 | 檉正汀渟淨淳湞濎炡玎珽町睛碇穽程 |
|  | f0 | 穽精綎艇訂諪貞鄭酊釘鉦鋌錠霆靖 |
| f0 | a0 | 靜頂鼎制劑啼堤帝弟悌提梯濟祭第 |
|  | b0 | 臍薺製諸蹄醍除際霽題齊俎兆凋助嘲 |
|  | c0 | 弔彫措操早晁曹曺朝條棗槽漕潮照燥 |
|  | d0 | 爪璪眺祖祚租稠窕粗糟組繰藻蚤詔 |
|  | e0 | 調趙躁造遭釣阻雕鳥簇族足鏃存尊卒 |
|  | f0 | 拙猝倧宗從悰棕淙琮種終綜縱腫 |

FIG. 6R

| UPPER | LOWER | 0 1 2 3 4 5 6 7 8 9 a b c d e f |
|---|---|---|
| f1 | a0 | 踪踵鍾鐘佐坐左座挫罪主住侏做蛛 |
|  | b0 | 冑呪周嗾奏宙州廚揍朱柱株注洲湊澍 |
|  | c0 | 炷珠嗾籌紂綢舟蛛誅走踌輳週酎 |
|  | d0 | 酒鑄駐竹粥俊傷准埈峻晙樽浚濬 |
|  | e0 | 焌畯竣蠢逡遵雋儁中仲衆重即櫛 |
|  | f0 | 汁葺增憎曾拯烝蒸症繒蒸證贈之只 |
| f2 | a0 | 咫地址志持指摯支旨智枝枳止池沚 |
|  | b0 | 漬知砥祉祇紙肢脂至芝芷蜘誌贄趾 |
|  | c0 | 遲直稙稷織職唇嗔塵振搢晉晋桭珍 |
|  | d0 | 津溱珍瑨璡畛疹盡眞瞋秦縉縝臻蔯 |
|  | e0 | 診賑軫辰進鎭陣陳震侄叱姪嫉帙瓞 |
|  | f0 | 疾秩窒膣蛭質跌迭斟朕什執潗緝輯 |
| f3 | a0 | 鏶集徵懲澄且侘借叉嗟嵯磋 |
|  | b0 | 箚茶蹉車遮捉搾着窄鑿齪撰澯燦璨 |
|  | c0 | 瓚竄簒粲纘贊鑽餐饌刹察擦札紮 |
|  | d0 | 僭參塹慘慙懺斬站讒讖倉創唱娼廠 |
|  | e0 | 彰愴敞昌昶暢槍滄漲猖瘡窓脹艙菖蒼 |
|  | f0 | 債埰寀寨彩採砦綵菜蔡采釵冊柵策 |
| f4 | a0 | 責凄妻悽處倜刺剔尺慽戚拓擲斥滌 |
|  | b0 | 瘠脊蹠陟隻仟千喘天川擅泉淺玔穿舛 |
|  | c0 | 薦賤踐遷釧闡阡韆凸哲喆徹撤澈綴輟 |
|  | d0 | 轍鐵僉尖沾添甜瞻簽籤詹諂堞妾帖捷 |
|  | e0 | 牒疊睫諜貼輒廳晴淸聽菁請靑鯖切剃 |
|  | f0 | 替涕滯締諦逮遞體初剿哨憔抄招梢 |
| f5 | a0 | 椒楚樵炒焦硝礁礎秒稍肖艸苕草蕉 |
|  | b0 | 貂超酢醋醮促囑燭矗蜀觸寸忖村邨叢 |
|  | c0 | 塚寵悤憁總聰蔥銃撮催崔最墜抽推 |
|  | d0 | 椎楸樞皺秋芻萩諏趨酋酉醜錐錘 |
|  | e0 | 鎚雛騶鰍丑畜祝竺筑築縮蓄蹙蹴軸逐 |
|  | f0 | 春椿瑃出朮黜充忠沖蟲衝衷悴膵萃 |

FIG. 6S

| UPPER | LOWER | 0 1 2 3 4 5 6 7 8 9 a b c d e f |
|---|---|---|
| f6 | a0 | 贇取吹嘴娶就炊翠聚脆臭趣醉聚鷲 |
|    | b0 | 倒以胴惆洲脣俊儁啣時輟恥栀治濡熾 |
|    | c0 | 痔痴癡稚稱繻綴置致齒輶雛馳曲則勒 |
|    | d0 | 飭親七柒漆僕腰枕沈浸琛砧針鍼墊秤 |
|    | e0 | 稱快他咤唾墮安惰打拖朶楕舵陀駄駝 |
|    | f0 | 俤卓啄坼度托拓擢啅柝濁灑琢瑑託 |
| f7 | a0 | 鐸呑嘆坦彈悵歎灘炭綻艇奪脫探眈 |
|    | b0 | 耽貪塔搭榻宕帑湯糖藩兌台太忰惫怠 |
|    | c0 | 汰泰箚胎苔跆邰颱宅擇澤撑擔兎吐土 |
|    | d0 | 討慟桶洞痛筒統通堆槌腿褪退頽偢套 |
|    | e0 | 妬投透鬪慝特闖坡婆巴把播擺杷波派 |
|    | f0 | 爬琶破腿芭跛頗判坂板版瓣販辦飯 |
| f8 | a0 | 阪八叭捌佩呗悖敗沛浿牌狽稗秤貝 |
|    | b0 | 彭澎烹膨愎便偏刷片篇編翩邊鞭貶 |
|    | c0 | 坪平枰萍評吠斃幣廢弊斃肺蔽閉陛佈 |
|    | d0 | 包匍匏咆哺圃布怖抛抱捕暴泡浦疱砲 |
|    | e0 | 胞肺苞葡蒲袍褒襃舖飽鉋飽曝瀑爆 |
|    | f0 | 輻俵剽彪慓杓標漂瓢票表豹飇飄驃 |
| f9 | a0 | 品稟楓諷豊風馮彼披疲皮被避陂匹 |
|    | b0 | 弼必祕珌畢疋筆苾馝乏逼下何厦夏廈 |
|    | c0 | 廳河瑕荷蝦賀遐霞煆瑕學虐瘧鶴壑恨 |
|    | d0 | 悍旱汗漢澣瀚罕翰閑閒限韓割轄函含 |
|    | e0 | 咸啣喊檻涵緘艦衘陷鹹合哈蛤閤闔 |
|    | f0 | 陝亢伉姮嫦巷恒抗杭桁沆港缸肛航 |
| fa | a0 | 行降項亥偕咳垓奚孩害楷海瀣蟹 |
|    | b0 | 解該諧邂駭骸劾核俸幸杏荇行享向嚮 |
|    | c0 | 珦鄕響饗香噓墟虛許憲櫶獻軒歇險 |
|    | d0 | 驗奕爀赫革倪峴弦懸晛泫炫玄玹現眩 |
|    | e0 | 眄絃絢縣舷衒見覡鉉顯子穴血頁嫌俠 |
|    | f0 | 協夾峽挾浹狹脅莢鋏頰亨兄刑型 |

FIG. 6T

| UPPER | LOWER | 0 1 2 3 4 5 6 7 8 9 a b c d e f |
|---|---|---|
| fb | a0 | 形洞粢澄瀅炯烡珩瑩荊螢衡逈邢蓉 |
| | b0 | 馨兮彗慧盻憓蹊醯鞋乎互呼壞戶好 |
| | c0 | 岵弧戶濠昊晧毫浩滸湖滸澔濩灝狐 |
| | d0 | 琥瑚瓠皓祜糊縞胡芦葫蒿虎號蝴護豪 |
| | e0 | 鎬頀顥惑或酷婚昏混渾琿魂忽惚笏哄 |
| | f0 | 弘汞泓洪烘紅虹訌鴻化和嬅樺火譁 |
| fc | a0 | 禍禾花華話譁貨靴廓擴攜確碻穫丸 |
| | b0 | 喚奐宦幻患換歡院桓渙煥環紈還驩鰥 |
| | c0 | 活滑猾豁闊凰幌徨恍惶愰慌晃晄悅況 |
| | d0 | 湟混潢煌璜皇篁簧荒蝗遑隍所匯回廻 |
| | e0 | 徊恢悔懷晦會檜淮滄灰獪繪膾茴蛔洄 |
| | f0 | 賄劃獲宖橫鐄哮嚆孝效敩曉梟淆淯 |
| fd | a0 | 爻肴酵驍侯候厚后吼喉嗅帿後朽煦 |
| | b0 | 珝逅勛勳塤焄熏燻薰訓暈薨喧暄煊 |
| | c0 | 萱卉喙毁彙徽揮暉煇諱輝麾休携烋畦 |
| | d0 | 虧恤譎鷸兇凶匈洶胸黑昕欣炘痕吃屹 |
| | e0 | 紇訖欠欽歆吸恰洽翕興僖熙喜噫憙姬 |
| | f0 | 嬉希憙憘戱晞曦熹熺犧禧稀羲詰 |
| fe | a0 | |
| | b0 | |
| | c0 | USER'S DEFINITION REGION |
| | d0 | FOR CHINESE CHARACTER |
| | e0 | |
| | f0 | |
| ff | a0 | |
| | b0 | |
| | c0 | NOT IN USE |
| | d0 | |
| | e0 | |
| | f0 | |

FIG. 10

1 COLUMN                                    18 COLUMN
  ↑                                              ↑

|   |   |   |   |   |   |   |   |   |   |   |   |   |   |   |   |   |   |
|---|---|---|---|---|---|---|---|---|---|---|---|---|---|---|---|---|---|
|   |   |   |   |   |   |   |   |   |   |   |   |   |   |   |   |   |   |
|   |   |   |   |   |   |   |   |   |   |   |   |   |   |   |   |   |   |
|   |   |   |   |   |   |   |   |   |   |   |   |   |   |   |   |   |   |
|   |   |   |   |   |   |   |   |   |   |   |   |   |   |   |   |   |   |
|   |   |   |   |   |   |   |   |   |   |   |   |   |   |   |   |   |   |
|   |   |   |   |   |   |   |   |   |   |   |   |   |   |   |   |   |   |
|   |   |   |   |   |   |   |   |   |   |   |   |   |   |   |   |   |   |
|   |   |   |   |   |   |   |   |   |   |   |   |   |   |   |   |   |   |
|   | 다 | 음 | 은 |   | R | OL | L |   | 표 | 시 | 법 | 의 |   | 데 | 이 | 터 |   | 전 | 송 | 에 |

← 1 ROW
← 2 ROW
← 3 ROW
← 4 ROW
← 5 ROW
← 6 ROW
← 7 ROW
← 8 ROW
← 9 ROW
← 10 ROW

FIG. 11

1 COLUMN                                    18 COLUMN
  ↑                                              ↑

(Grid with bottom two rows:)
다 음 은  R OL L  표 시 법 의  데 이 터  전 송 에   ← 9 ROW
대 한 예 를  보 인 것 이 다 .                      ← 10 ROW

← 1 ROW
← 2 ROW
← 3 ROW
← 4 ROW
← 5 ROW
← 6 ROW
← 7 ROW
← 8 ROW

FIG. 12

1 COLUMN — 18 COLUMN

| | | | | | | | | | | | | | | | | | | |
|---|---|---|---|---|---|---|---|---|---|---|---|---|---|---|---|---|---|---|
| | | | | | | | | | | | | | | | | | | ←1 ROW |
| | | | | | | | | | | | | | | | | | | ←2 ROW |
| | | | | | | | | | | | | | | | | | | ←3 ROW |
| | | | | | | | | | | | | | | | | | | ←4 ROW |
| | | | | | | | | | | | | | | | | | | ←5 ROW |
| | | | | | | | | | | | | | | | | | | ←6 ROW |
| | | | | | | | | | | | | | | | | | | ←7 ROW |
| | | | | | | | | | | | | | | | | | | ←8 ROW |
| 대 | 한 | 예 | 를 | | 보 | 인 | 것 | 이 | 다 | . | | | | | | | | ←9 ROW |
| 또 | 한 | | 줄 | 을 | R | OL | L- | UP | 시 | 킨 | 다 | . | | | | | | ←10 ROW |

FIG. 13

1 COLUMN — 18 COLUMN

| | | | | | | | | | | | | | | | | | |
|---|---|---|---|---|---|---|---|---|---|---|---|---|---|---|---|---|---|
| | | | | | | | | | | | | | | | | R | ←1 ROW |
| | | | | | | | | | | | | | | | | O | 이 | ←2 ROW |
| | | | | | | | | | | | | | | | | L | 번 | ←3 ROW |
| | | | | | | | | | | | | | | | | L | 에 | ←4 ROW |
| | | | | | | | | | | | | | | | | | 는 | ←5 ROW |
| | | | | | | | | | | | | | | | | 표 | | ←6 ROW |
| | | | | | | | | | | | | | | | | 기 | 세 | ←7 ROW |
| | | | | | | | | | | | | | | | | 의 | 로 | ←8 ROW |
| | | | | | | | | | | | | | | | | | 쓰 | ←9 ROW |
| | | | | | | | | | | | | | | | | 예 | 기 | ←10 ROW |

FIG. 14

| | | | | | | | | | | | 를 | R | |←1 ROW
|---|---|---|---|---|---|---|---|---|---|---|---|---|---|
| | | | | | | | | | | | | O | |←2 ROW
| | | | | | | | | | | | 보 | L | |←3 ROW
| | | | | | | | | | | | 인 | L | |←4 ROW
| | | | | | | | | | | | | | |←5 ROW
| | | | | | | | | | | | 것 | 표 | |←6 ROW
| | | | | | | | | | | | 이 | 기 | |←7 ROW
| | | | | | | | | | | | 다 | 의 | |←8 ROW
| | | | | | | | | | | | . | | |←9 ROW
| | | | | | | | | | | | | 예 | |←10 ROW

1 COLUMN ↑ (leftmost)     18 COLUMN ↑ (rightmost)

CLOSED-CAPTION BROADCASTING AND DISPLAYING METHOD AND APPARATUS SUITABLE FOR SYLLABLE CHARACTERS

BACKGROUND OF THE INVENTION

1. Field of the Invention

The present invention relates to a closed-caption broadcasting and displaying method and apparatus, and more particularly, to a closed-caption broadcasting and displaying method and apparatus, whereby display of the closed-caption of syllable characters such as Hangul (Korean alphabet) can be properly controlled.

2. Description of the Related Art

The caption broadcasting system in television broadcasting can be classified into an open caption system for displaying a caption of emergency news, announcements, etc., on a television screen by selection of a broadcaster by superimposing the caption signal in an active period of a television signal, and a closed caption system for displaying a caption of words on the screen by selection of a viewer by encoding the caption signal in a non-active period, i.e., in a vertical blanking interval of the television signal.

The closed-caption broadcasting has been carried out in the United States since 1978 for people who have difficulty in hearing and cannot recognize the words of the scene without sign language. The closed-caption broadcasting is also useful in studying a foreign language.

The U.S. Pat. No. 5,294,982 issued on March, 1994 discloses a closed-caption broadcasting system suitable for displaying Roman characters and syllable characters. Especially, captioning of the syllable characters such as Korean is explained in detail in this patent. According to this patent, in order to broadcast Hangul (Korean alphabet) as a closed-caption, one Hangul character is separated into initial, medial, and final consonant phonemes and ASCII (American Standard Code for Information Interchange) codes corresponding to the respective consonant phonemes are transmitted. In a receiving part, the ASCII codes are received and decoded, and then the initial, medial, and final consonant phonemes are mapped to form and display the Hangul character.

However, according to this conventional Hangul closed-captioning system, since at least two or three bytes of data should be used for representing one Hangul character, the transmission speed and the display speed thereof become lowered. Also, its decoding process becomes complicated because the position of one Hangul character is searched by combination of three or four bytes of data, causing the cost of a caption decoder to increase.

Also, the conventional Hangul closed-captioning system has difficulty in simultaneously displaying Chinese characters, Hangul, and Japanese, and in simultaneously displaying English, Russian and Greek, as well as in displaying special symbols.

Also, since a control code is required in case of displaying word information between additional information and then displaying additional information again, there is no independence between the word information and additional information, and the control system for discriminating a display mode of the word information becomes complicated. If the display mode control code is not received at the start point of the receiving device's operation, the word information cannot be displayed until a next control code is received.

Further, since the conventional system has been developed based on the television broadcasting environment in the United States, it shows an inferior receiving state in the geographic setting of Korea that has mountainous districts over 70%, thereby deteriorating the quality of the caption display.

Meanwhile, related arts regarding the closed-caption broadcasting and receiving apparatuses are disclosed in U.S. Pat. Nos. 5,327,176, 4,310,854, 5,347,365, 5,249,050, 5,374,960, and 5,315,386, and Japanese Patent Laid-open Nos. 6-165065 and 6-165064.

SUMMARY OF THE INVENTION

It is an object of the present invention to solve the problems involved in the prior art, and to provide a closed-caption broadcasting and displaying method especially having an effect on the display of syllable characters such as Hangul.

In one aspect of the present invention, there is provided a method of broadcasting a closed-caption signal which includes character information and control information and which is encoded in a scanning line of each field of a television broadcasting signal which does not affect the television broadcasting signal, characterized in that control information on a writing direction and a display position of the caption signal among the control information is repeatedly transmitted at predetermined intervals.

In another aspect of the present invention, there is provided a method of displaying closed-caption information comprising the steps of displaying on a screen a caption in a predetermined writing direction and display position when a closed-caption mode is selected; checking whether or not control information on a writing direction and display position is inputted at predetermined intervals; and changing a present writing direction and display position to a predetermined writing direction and display position in response to an input of the control information on the writing direction and display position as a result of checking so as to display the caption in the changed writing direction and display position.

In still another aspect of the present invention, there is provided a method of changing a display position of closed-caption information encoded in a scanning line of each field of a television video signal which does not affect the television video signal, the method comprising the steps of checking an input of a command for changing the display position of caption words; and alternately changing the display position of the caption words from a first initial position to a second initial position and vice versa every time when it is checked that the command for changing the display position of the caption words is inputted so as to display the caption words in the changed display position.

In still another aspect of the present invention, there is provided a method of changing a writing direction of closed-caption information encoded in a scanning line of each field of a television video signal which does not affect the television video signal, the method comprising the steps of checking an input of a command for changing the writing direction of caption words; and alternately changing the writing direction of the caption words from a first writing direction to a second writing direction and vice versa every time when it is checked that the command for changing the writing direction of the caption word is inputted so as to display the caption words in the changed writing direction.

In still another aspect of the present invention, there is provided a fine adjustment method of an initial display position of closed-caption information encoded in a scanning line of each field of a television video signal which does not affect the television video signal, the fine adjustment method comprising the steps of checking an input of a command for fine adjustment of a display position of caption words; and finely adjusting the initial display position of the caption words in upper, lower, left and right directions every time when it is checked that the fine adjustment command is inputted so as to display the caption words in the adjusted display position.

In still another aspect of the present invention, there is provided a method of displaying closed-caption encoded in a scanning line of each field of a television video signal which does not affect the television video signal, the method comprising the steps of displaying on a screen a caption in a predetermined writing direction and display position when a closed-caption mode is selected; checking whether or not control information on a writing direction and display position is inputted at predetermined intervals; checking whether a user's display mode is selected if it is checked that the control information on the writing direction and display position is inputted; changing a present writing direction and display position to a predetermined writing direction and display position in response to the control information on the writing direction and display position if it is checked that the user's display mode is not selected; checking an input of a user's command for display change if it is checked that the user's display mode is selected or if the control information is not inputted, and checking an input of the control information; selecting the user's display mode if it is checked that the user's command for display change is inputted; and processing the display of the caption words in response to the inputted user's command for display change, and checking the input of the control information.

BRIEF DESCRIPTION OF THE DRAWINGS

The above object, other features and advantages of the present invention will become more apparent by describing the preferred embodiments thereof with reference to the accompanying drawings, in which:

FIG. 5 is a view explaining the control code according to the present invention.

FIGS. 6A to 6T are views illustrating Hangul completion type code tables explaining the structure of the character code according to the present invention.

FIGS. 10 to 12 are views explaining the scroll function of a caption displayed on the screen by horizontal writing according to the present invention.

FIGS. 13 and 14 are views explaining the scroll function of a caption displayed on the screen by vertical writing according to the present invention.

DETAILED DESCRIPTION OF THE PREFERRED EMBODIMENTS

Figure 1:
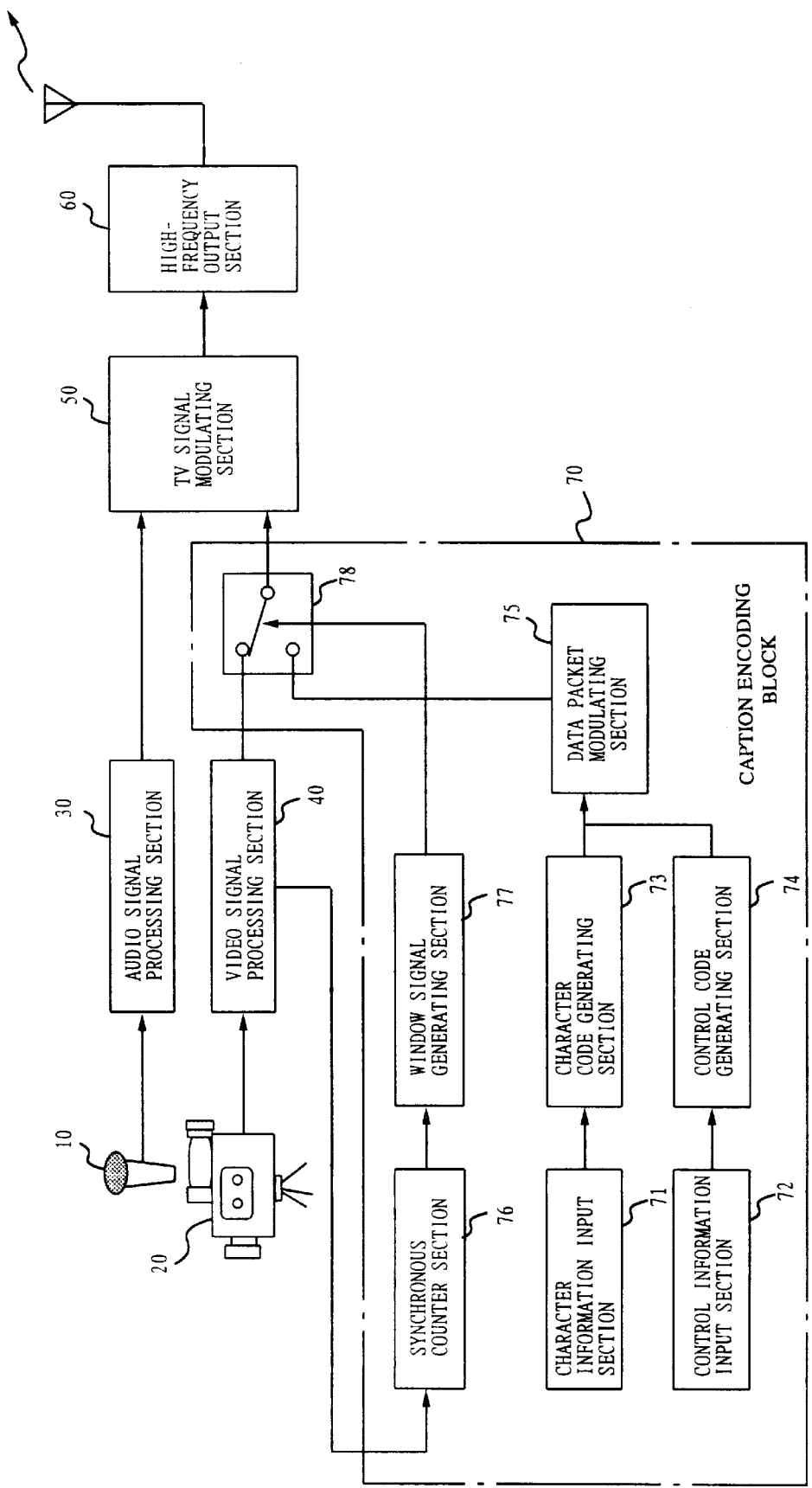
FIG. 1 is a block diagram of a television broadcasting system incorporating the viewer's selection type caption broadcasting apparatus according to the present invention.

FIG. 1 shows the structure of a television broadcasting system incorporating a viewer's selection type caption broadcasting apparatus according to the present invention.

Referring to FIG. 1, an audio signal inputted through a microphone 10 is mixed and amplified by an audio signal processing section 30 and then provided to a television (TV) signal modulating section 50. A video signal inputted through a video camera 20 is amplified and edited by a video signal processing section 40 and then provided to the TV signal modulating section 50. The TV signal modulating section 50 frequency-modulates the audio signal, amplitude-modulates the video signal by vestigial-sideband modulation, and frequency-multiplexes and frequency-transits the amplitude-modulated (AM) signal and the frequency-modulated (FM) signal to produce a high-frequency signal. The high frequency signal is then amplified by a high-frequency output section 60 to be transmitted through an antenna as a television signal.

Word information related to the television screen or additional information such as emergency news, announcements, etc., is inputted to a caption encoding block 70 through a character information input section 71. Control information for the caption control is inputted through a control information input section 72. The character information input section 71 includes a keyboard for inputting characters of Hangul, English, Chinese, Japanese, etc., and special characters, and outputs syllable characters, for example, a 2-byte Hangul completion type code (KSC 5901) in response to the input character information. The control information input section 72 includes keypads such as a mode selection key, a function selection key, etc., and outputs a 7-bit binary code in response to the input control information.

A character code generating section 73 uses the MSB (most significant bit) of each byte of the input 2-byte character code as a caption word/additional information flag, and generates a data packet of an 18-bit character code by replacing the MSB by "0" in case of the additional information and then adding a parity bit to each byte.

A control code generating section 74 generates a data packet of an 18-bit control code by dividing the input 7-bit control information into upper 4 bits and lower 3 bits, creating an upper byte by adding to the upper 4 bits a parity bit, control code discriminating bits of 2 bits, and a word/addition flag, creating a lower byte by adding to the lower 3 bits a first parity bit, a second parity bit, control code discriminating bits of 2 bits, and a caption word/additional information flag, and then adding a parity bit to each created byte. A detailed explanation about the data packet will follow.

A data packet modulating section 75 modulates the data packet generated by the character code generating section 73 or the control code generating section 74 by digital modulation.

A synchronous counter section 76 receives a sync signal provided from the video signal processing section 40, and is reset by a vertical sync signal. The synchronous counter section 76 counts a horizontal sync signal to select the 262nd scanning line of an odd field and the 525th scanning line of an even field.

A window signal generating section 77 receives the counted value of the synchronous counter section 76 and generates a window signal, which is a switching control signal of a switching section 78 for superimposing the caption signal in specific lines, for example, in the 262nd and 525th scanning lines of the video signal outputted from the video signal processing section 40.

Figure 2:
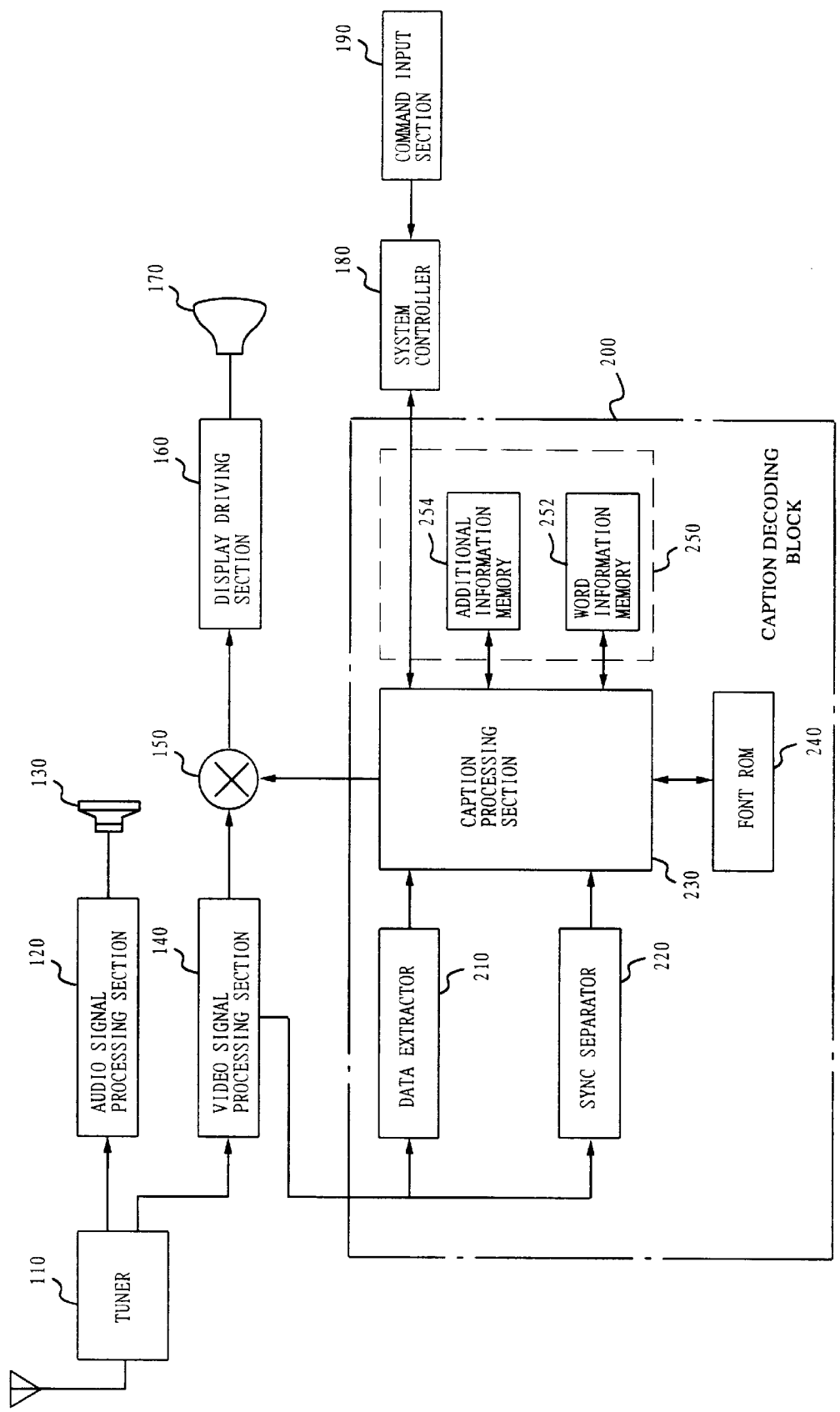
FIG. 2 is a block diagram of a television receiver incorporating the viewer's selection type caption broadcast receiving apparatus according to the present invention.

FIG. 2 shows the structure of a television receiver incorporating the viewer's selection type caption broadcast receiving apparatus according to the present invention.

Referring to FIG. 2, a tuner 110 selects a television signal of a selected channel among high frequency signals received through an antenna, and demodulates the selected television signal to output an audio signal and a video signal. The audio signal is equalized and amplified by the audio signal processing section 120 and then outputted to a loudspeaker 130. The video signal is luminance-processed and chrominance-processed by the video signal processing section 140 to be outputted as a composite video signal. The composite video signal is provided to a display driving section 160 through a mixer 150. The display driving section 160 drives a CRT (cathode ray tube) 170 in response to the composite video signal to display a corresponding image on the screen of the CRT 170. In a caption decoding block 200, the video signal is converted into a digital signal through a data extractor 210, and the digital signal is inputted to a caption processing section 230. The data extractor 210 may comprise an analog-to-digital (A/D) converter, or a slice integrated circuit. At the same time, a sync separator 220 separates vertical and horizontal sync signals from the video signal, and outputs the sync signals to the caption processing section 230.

Figure 19:
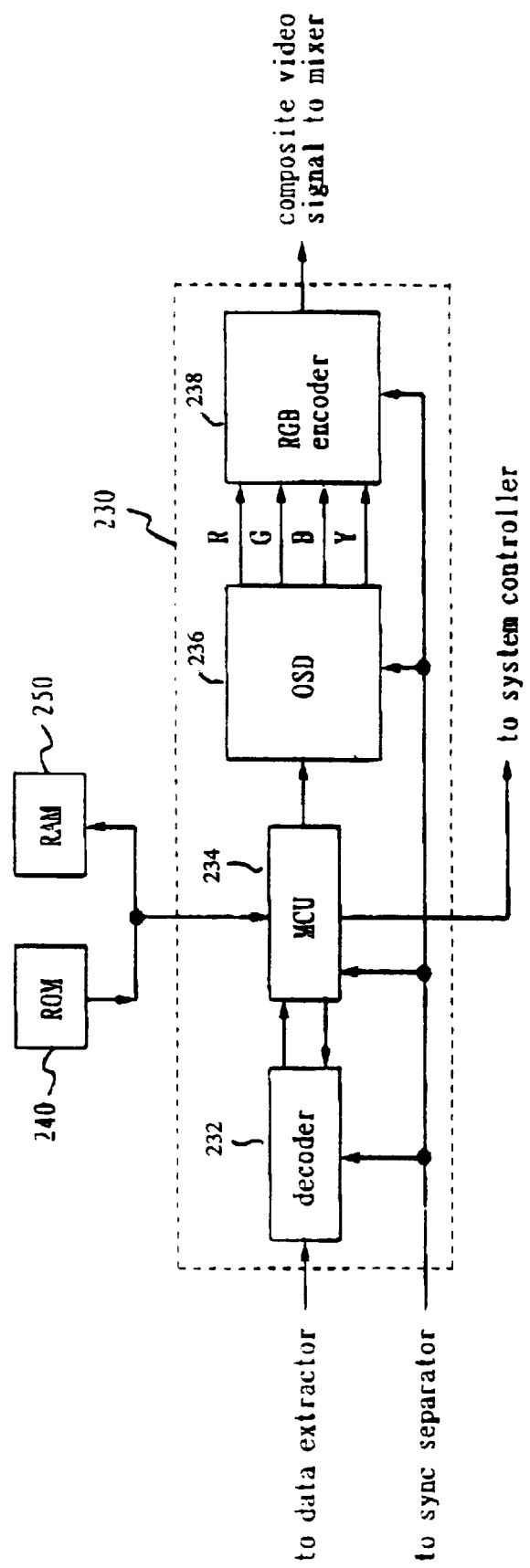
FIG. 19 is a block diagram of a caption processing section shown in FIG. 2.

As shown in FIG. 19, caption processing section 230 includes a decoder 232, microcomputer 234, on-screen generator 236, and RGB (red, green, blue) encoder 238. The decoder 232, which comprises an ASIC chip, analyzes the data extracted by the data extractor 210, detects the existence of error in the data, and stores and updates the additional information. The microcomputer 234 performs data communications with a system control section 180, and analyzes the data provided from the decoder 232. If the data is the control code, the microcomputer performs the corresponding control process, and stores in a RAM 250 values mating with addresses of a font ROM 240 which uses the 16-bit Hangul completion type code. The on-screen generator 236 generates Y (luminance), R (red), G (green), and B (blue) signals in accordance with the data read out from the font ROM 240 which is addressed by the values stored in the RAM 250. The RGB encoder 238 includes an encoder for producing a composite video signal according to the Y, R, G, and B signals. The composite video signal is provided to the mixer 150.

The font ROM 240 contains bit-map type character information which corresponds to the Hangul completion type KSC 5601 code value.

A command input section 190 comprises a remote controller and/or a key input section, and contains at least the following caption-related command functions:

display of reception or non-reception of a caption packet in a field display of the receiving sensitivity of a caption display of existence or nonexistence of two languages display of reception or non-reception of additional information on/off function of caption words on/off function of additional information holding function of an additional information page selection function of caption words of two languages prevention function of vertical writing change of writing directions change of display positions fine adjustment function of the display position The detailed structure of a caption signal for use in the caption broadcasting and receiving systems as described above will be explained.

In Korea, an M-NTSC type television signal having 525 scanning lines, 60 fields per second, has been used as a broadcasting signal. It is prescribed that vertical blanking intervals exist in the range of 1st to 20th scanning lines in the odd fields, and in the range of 264th to 282nd scanning lines in the even fields.

A standard of use of vertical blanking intervals has not yet been provided by organizations concerned, but ITU-R Recommendation 473-2, and FCC Report and Order 83-120 in the United States may serve as a reference.

In order to transmit caption data, one of 10th to 20th lines of vertical blanking intervals, and 21st, 262nd, and 525th lines in active video periods may be used. Also, more than one line may be used for increasing the data transmission rate or for other purposes.

The transmission bit rate of the caption data should be in the range of 447443.125 bps ±125 bps, and the maximum value of the long-term variation should be less than ±196 (0.0125 bps). The caption data signal should be necessarily used only in transmitting a color television signal. Further, the transmission bit rate is determined to be ⅛ of the chrominance subcarrier frequency fsc (3579545±10 Hz), and the chrominance subcarrier is frequency-synchronized with a color burst. It is preferable that the chrominance subcarrier has a continuous phase between the scanning lines. In the event that the phase of the chrominance subcarrier is discontinuous due to the picture editing, the chrominance subcarrier should be frequency-synchronized at least with the color burst of the corresponding line.

The data is modulated by digital modulation named BPSK (binary phase shift keying) or PRK (phase reversal keying) whereby a logic value of "1" is represented by one period of a sine wave having a phase of 0 degree and having a frequency of fsc/8 (447.443 KHz), and a logic value of "0" is represented by one period of a sine wave having a phase of 180 degrees and having a frequency of fsc/8 (447.443 KHz). The maximum range of the phase jitter is ±10. The optimum signal waveform can be changed in accordance with the frequency spectrum characteristic of a television channel, and will be prescribed hereafter. However, since severe distortion of the BPSK waveform may occur in a region where the transition of the logic value is generated due to the basic band limit frequency, the waveform, which passed through a second Butterworth filter having a cut-off frequency of 3.5 MHz and then phase-compensated, will be used in broadcasting. The impulse response of the Butterworth filter to be used is expressed by $$|H(f)| = 1/\sqrt{1+(f/fc)^4}$$

(where ƒc=3.5 MHz)

Examination No. 1–7 (television broadcasting station), Item 4 (teletext), Paragraph Na (superimposing position of a data line and an amplitude of a character signal), among Korean Radio Station Examination Items defines an examination method and ground. Since the waveform of the caption signal is not an NRZ (non-return-to-zero) waveform, but is a pure sine wave, it is not required to apply the above-described standard. However, in order to extend the receiving districts, considering the geographic setting of Korea having mountainous districts over 70%, the maximum value of the sine wave will be determined to be 90±5 IRE. Since the data signal may include an overshoot due to the filter pass-band characteristic, etc., though the maximum amplitude of normal data signal is defined, the maximum absolute value of the overshoot will be determined to be 5 IRE.

Figure 3:
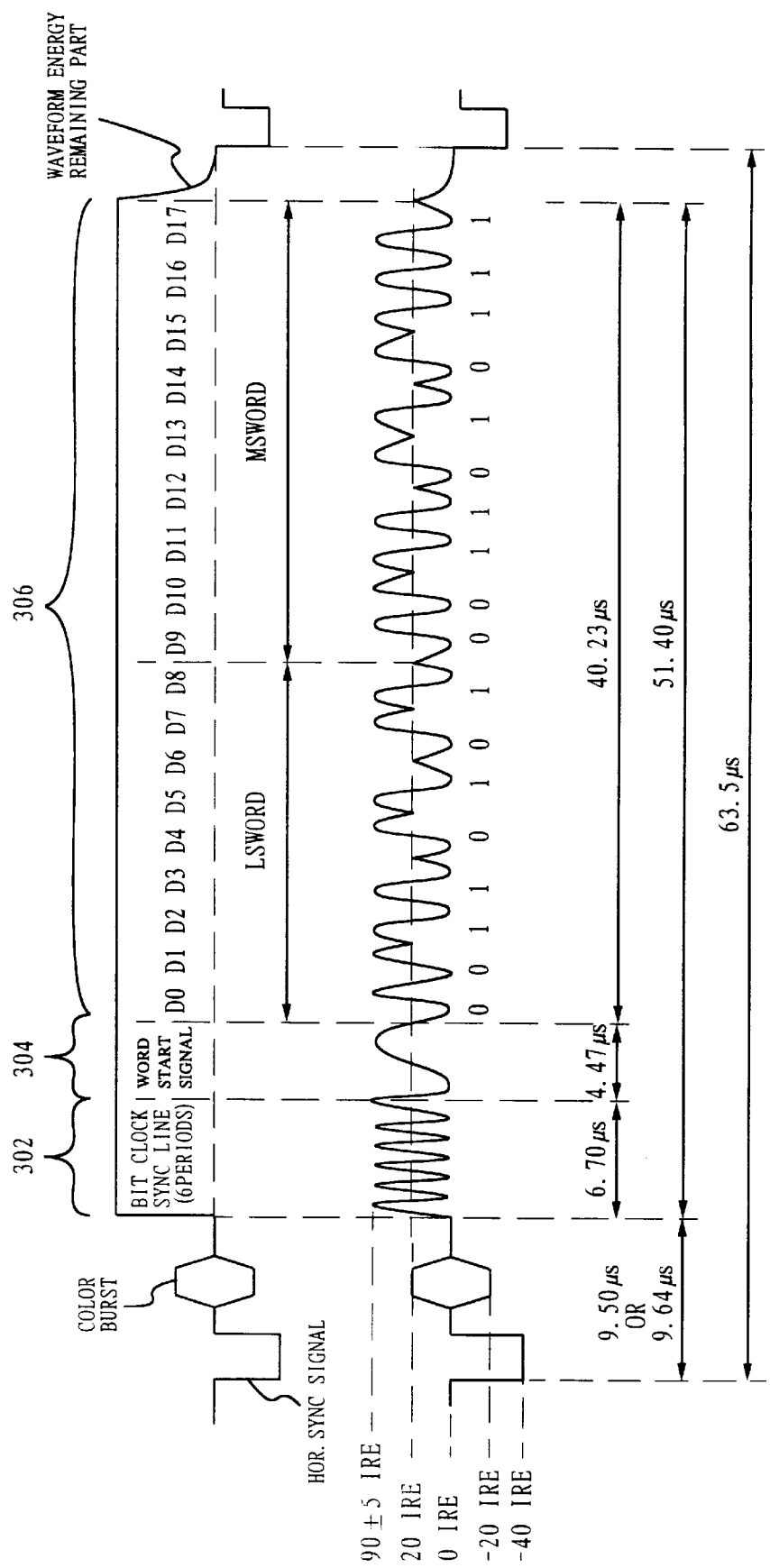
FIG. 3 is a view illustrating the structure of the caption signal according to the present invention.

Referring to FIG. 3, the data line of the caption signal includes a bit clock sync signal 302 of 6 periods, a word start signal 304, and a data line of 18 bits.

The bit clock sync signal 302, which is a sine wave of 6 periods, is extracted by the caption decoding block, and a frequency of fsc/4 (894.886 KHz) is used for reading the bit period of the 18-bit data. The bit clock sync signal 302 starts at a point which is apart from the center point OH of the falling edge of the horizontal sync signal by 9.5 μs (34 periods of the color burst) in the event that the phase of the chrominance subcarrier of the corresponding scanning line is 0 degree, while it starts at a point which is apart from the center point OH of the falling edge of the horizontal sync signal by 9.64 μs (34.5 periods of the color burst) in the event that the phase of the chrominance subcarrier of the corresponding scanning line is 180 degrees.

The bit clock sync signal is frequency-synchronized with the color burst of the corresponding line, and thus it can be extracted from the color burst.

The word start signal 304 has a frequency of fsc/16 (223.722 KHz), and corresponds to one period of the sine wave having a phase of 180 degrees. The word start signal 304 indicates the start of the 18-bit data packet.

The data line 306 includes 18 bits, and has a bit rate of fsc/8 (447.443 KHz). The data line 306 is modulated by BPSK modulation.

Figure 4A:
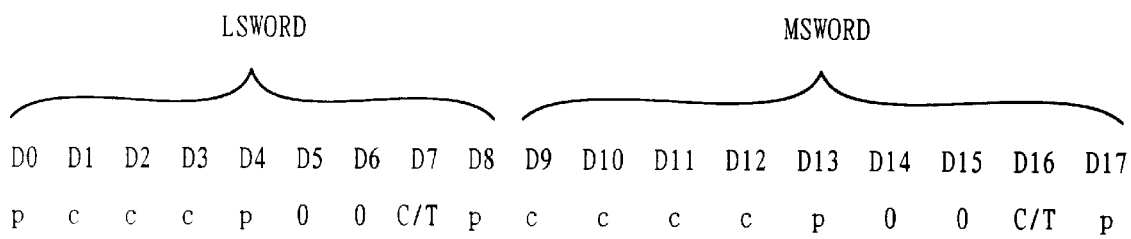
FIGS. 4A and 4B are views illustrating the data packet structure of the caption signal according to the present invention.
Figure 4B:
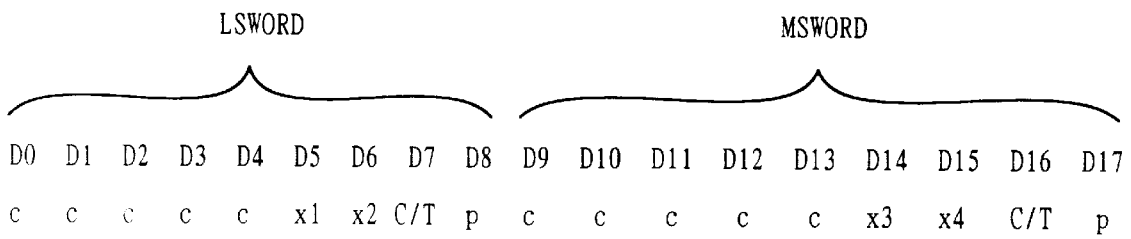

Referring to FIGS. 4A and 4B, the data packet includes three parts, that is, a parity P in the unit of a word, a caption word/additional information flag C/T, and a code value. D0 to D8 denote lower words, D9–D17 denote upper words, and D17 denotes an even parity for firstly detecting an error of transmission. D7 and D16 are caption word/additional information flags which have the value of "0" in case of the caption words, while having the value of "1" in case of the additional information. The values of D7 and D16 should necessarily coincide with each other. These flags are used for keeping the priority order of the words. D0 to D6, and D9 to D15 denote the code values. If all the code values of D5, D6, D14, and D15 are "0", the code is analyzed as a control code. Otherwise, it is analyzed as a character code.

Referring to FIG. 4A, D1, D2, D3, D9, D10, D11, and D12 of the 7-bit control code are control code data bits, and D0, D4, D8, and D13 are parity bits for the control code data bits. As shown in FIG. 5, the 3-bit code value of the lower words is for designating five functions of color designation, character attribution and roll-up, display method and roll-down, movement of position, and designation of matrix position. The 4-bit code value of the upper words of the control code designates 16 subfunctions for the respective functions as above. Here, D0 is a parity for D1, D2, D3, and D4, D4 is a parity for D1, D2, D10, and D11, and D13 is a parity for D9, D10, D11, and D12.

Also, the control code is consecutively twice transmitted for the safe reception of data, and the horizontal/vertical writing designation code and the matrix position designation code are periodically transmitted every 4 seconds. A detailed description of the control code will follow.

Referring to FIGS. 6A to 6T, the character code includes data bits of KSC 5601 code including lower words of D0 to D6 and upper words of D9 to D15. D8 is an even parity for D0 to D7.

According to the present invention, the ASCII code is not used. The 7 bits of D0 to D6 correspond to the lower byte of KSC 5601 except for the MSB, and the 7 bits of D9 to D15 correspond to the upper byte thereof except for the MSB. Among the Hangul completion type codes (KSC 5601) illustrated in FIGS. 6A to 6T, a1 and a2 lines (special character), a3 line (English), a4 line (final consonant phoneme), a5 line (Greek), aa and ab lines (Japanese Hiragana/Katakana), ac line (Russian), b0 to c8 lines (Hangul), and ca to fd lines (Chinese characters) are limitedly used. The character code is transmitted once for a character.

As described above, the Hangul caption can be transmitted using any line in a field, and thus at least one transmission line in a field is defined as a channel. The NTSC type television constructs two fields by interlaced scanning, and thus two channels may be used in captioning. Specifically, caption words composed of two languages such as for a multivoice system may be used. In this case, an odd field channel is used for the Hangul caption words, and an even field channel is used for caption words of a foreign language. The control code transmitted through each channel is the same code set, and all the character codes are included in KSC 5601.

Two kinds of information are transmitted through the channels for captioning, and the analysis and display method thereof are changed in accordance with the kinds of information. One is a caption word related to the video signal being broadcast, while the other is additional information TEXT having no relation to the contents of the broadcast signal displayed on the screen.

In the LSWord and MSWord of the data packet structure, if the values of the caption word/additional information flags are all "0", the code is analyzed as that for displaying the caption words regardless of whether the code is a control code or a character code. In this case, the words which coincide with the audio signal are displayed as a caption, covering a portion of the picture.

About 2 to 5 rows of the caption words are simultaneously used. In order to display the continuous words, the caption words should be scrolled up within a predetermined caption display region of the screen, or new caption words should be displayed on the predetermined region after the previous caption words are erased therefrom.

In transmitting the caption signal through one channel, characters of several languages may be mixed, or the Hangul characters or the characters of a foreign language are exclusively transmitted through the channel. In transmitting the caption through two channels, the channels are divided into one for the exclusive use of the Hangul and the other for the exclusive use of the foreign language.

Since it is preferable that the caption words coincide with the audio information, the caption words have priority over the additional information in occupying the channel in the unit of 2 words.

In the LSWord and MSWord of the data packet structure, if the values of the caption word/additional information flag are all "1", the code is analyzed as that for displaying the additional information regardless of whether the code is a control code or a character code. The additional information is displayed over the entire screen such as in the computer communication regardless of the contents of the broadcasting signal. At this time, the scroll function is not used.

In transmitting the additional information through two channels, it is not required to divide the additional information as the caption information. The additional information can occupy the channels any time when the caption information is not carried through the channels, but when the caption words are to be transmitted, the right of channel occupation is immediately transferred thereto. The channel can be occupied by the additional information only after the transmission of the caption words is completed.

Next, the caption display according to the horizontal writings in a television receiver will be explained.

Figure 7:
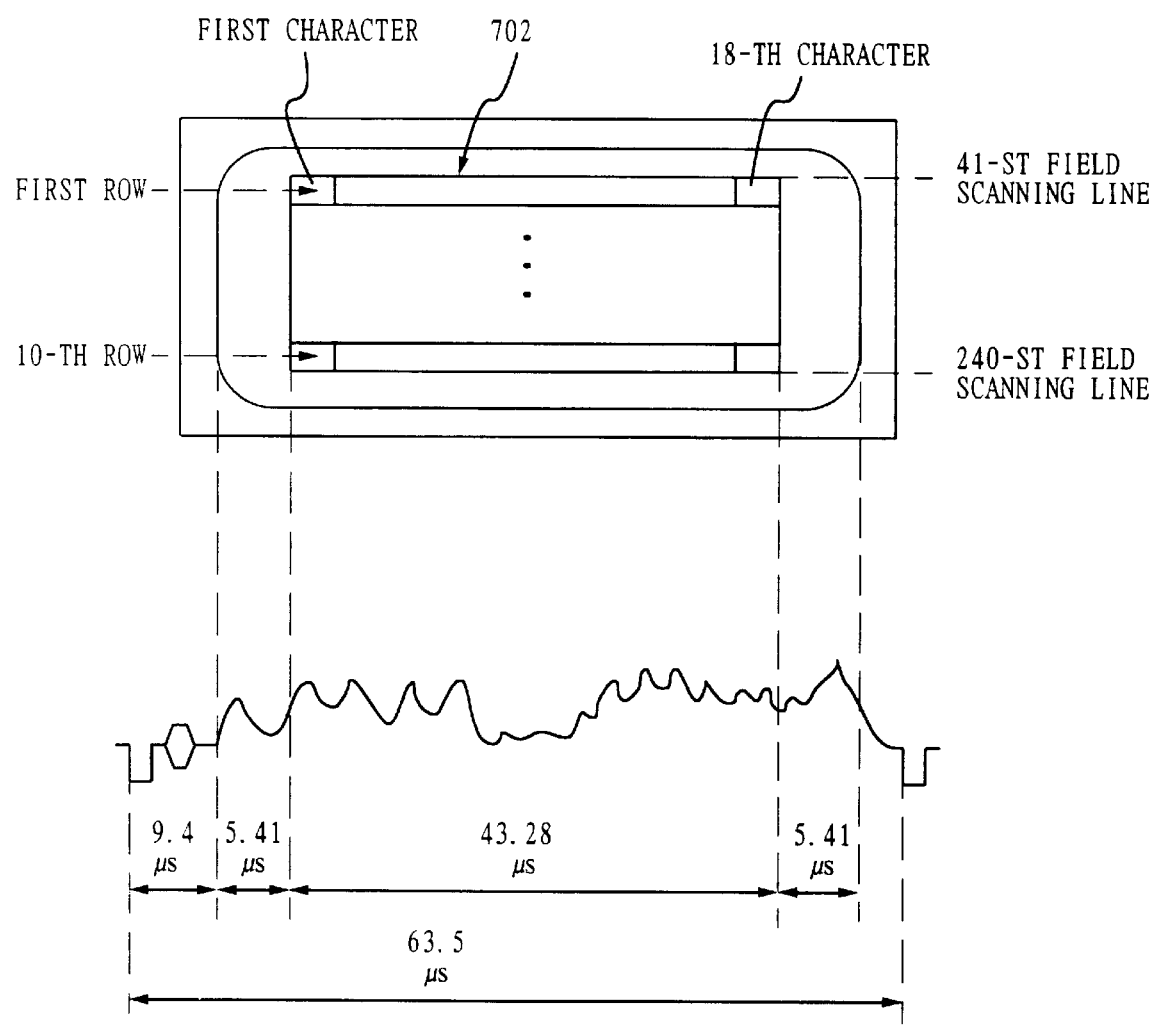
FIG. 7 is a view explaining the size of the caption region displayed on a screen according to the present invention.

Referring to FIG. 7, a caption display region 702 means a maximum screen region where caption words and additional information can be displayed. According to the NTSC type television signal in the unit of a field, the caption display region 702 corresponds to the scanning lines in the range of 41st to 240th lines, and has a height corresponding 200 scanning lines per field. Over the entire caption display region, 10 character rows are displayed. The width of the caption display region on the screen is determined to be about 80~85% of that (52.6 $\mu$s) of the effective scanning lines, and thus the horizontal length of all character rows is 80~85% of the effective scanning line's width.

Since display cells of Hangul, English, and Chinese characters constitute a vertical 20-bit map, one character row including Hangul, English, and Chinese characters corresponds to 20 television scanning lines.

The maximum number of characters of Hangul and Japanese Hiragana/Katakana to be displayed in a row is determined to be 18. The width of an English character corresponds to a half of a Hangul character, and thus the maximum number of English characters to be displayed in a row is 36. The Roman alphabet, Arabian numerals, and sentence symbols are considered the same as the English alphabet.

The width of one Chinese character is the same as a Hangul character, and thus the maximum number of Chinese characters to be displayed in a row is also 18.

All the characters supported by the KSC 5601 code can be used and displayed together. If so, 18 characters at a minimum through 36 characters at a maximum can be displayed in a row.

Figure 8C:
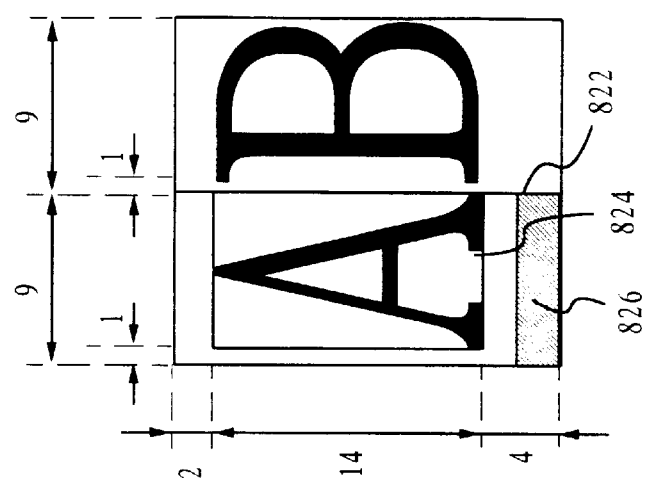
FIGS. 8A to 8C are views explaining character cells of Hangul, Chinese character, and English, and corresponding display cells arranged for horizontal writing according to the present invention.
Figure 8B:
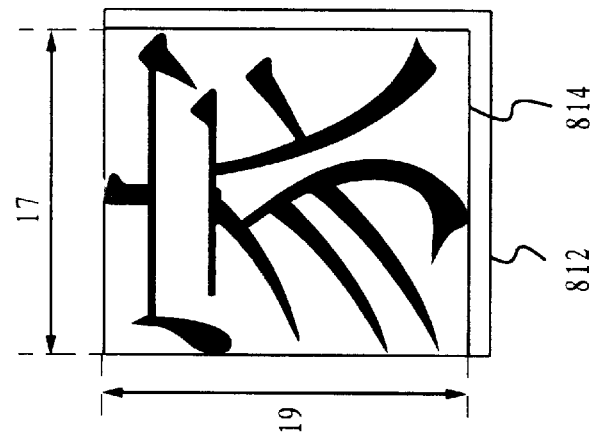
Figure 8A:
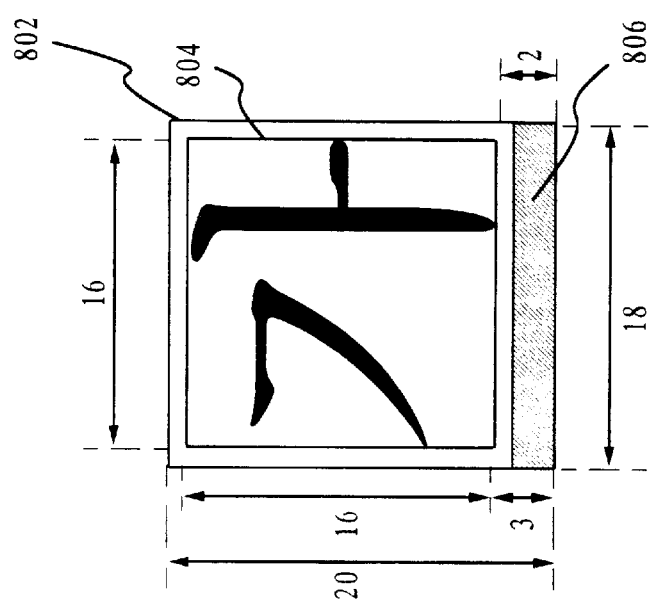

Referring to FIGS. 8A to 8C, when a character is displayed on the screen, a character cell 804, 814, or 824 represents a region occupied by a character itself without considering the space between characters, and a display cell 802, 812, or 822 represents a region occupied by a character in consideration of the space around the character.

The character cell 804 of one Hangul syllable to be displayed on the screen has a format of a 16×16 bit-map, and thus a Hangul character to be placed in the character cell is read out from a ROM which stores therein a 16×16 bit-map font.

In FIG. 8A, the display cell 802 of a Hangul syllable in consideration of the space between the characters has an 18×20 bit-map format so as to leave a space from the Hangul character cell 804 in upper, left, and right directions, respectively. In a lower direction, 2 spaces are additionally assigned to secure an underline region 806.

The caption display format of Japanese Hiragana/Katakana is the same as that of Hangul.

In FIG. 8B, the character cell 814 of a Chinese character to be displayed on the screen has a format of a 17×19 bit-map. The size of the Chinese character cell is provisionally determined, and then a different size, for example, a 16×16 size, may be determined according to the conditions of the font ROM and the internal circuit of the receiver.

The display cell 812 of a Chinese character in consideration of the space between the characters has an 18×20 bit-map format so as to leave a space from the Chinese character cell 814 in right and lower directions, respectively. Unlike Hangul or English, an underline region is not assigned to the Chinese character.

Accordingly, the width and height of the Chinese display cell 812 are the same as those of the Hangul display cell 802. As a result, the Chinese character has the same size as the Hangul character.

In FIG. 8C, the character cell 824 of an English character to be displayed on the screen has an 8×14 bit-map format.

The display cell 822 of an English character in consideration of the space between characters has a 9×20 bit-map format so as to leave 2 spaces in an upper direction, and one space in a right direction from the English character cell 824, respectively. In a lower direction, 2 spaces, in addition to the 2 spaces already mentioned, are assigned to secure an underline region 826.

Accordingly, the width of the English display cell 822 is a half of that of the Hangul display cell 802, and the height of the English display cell 822 is the same as that of the Hangul display cell 802. As a result, the size of the Hangul character is twice as large as that of the English character.

The Roman alphabet, Arabian numerals, and sentence symbols including a space character between the words are considered the same as the English alphabet.

In processing the character display within the display cell, an opaque ground process or a shadowed-edge process is performed in accordance with a control code of "ground color designation". The opaque ground may be changed to a semitransparent ground.

In the event that characters are displayed on the screen by the opaque ground process, the front portion of the first character as well as the rear portion of the last character, whose size corresponds to a Hangul syllable, may be processed as the opaque ground for convenience in reading.

Details of the control code will now be explained with reference to FIG. 5.

The control code includes two 9-bit words. Bits of D1, D2, and D3 for function classification are included in LSWord, and bits of D9, D10, D11, and D12 for selecting one of the classified functions are included in MSWord.

The control code is classified into control codes for color designation, attribute designation, display control, scrolling, cursor movement, and row/column position designation.

The color designation control code is a code for changing foreground and background colors of character data. Accordingly, if it is desired to change the foreground and background colors of the characters to be transmitted, the color designation control code is first transmitted and then the characters are transmitted. The receiver determines the foreground and background colors in accordance with the color designation control code received most recently. The foreground and background colors may be changed simultaneously or independently. The designated colors are black, red, magenta, blue, cyan, green, yellow, and white. If the background color is determined to be a transparent color, the television image can be shown on the remaining portion of the display cell except for the character portion. At this time, the characters are outline-processed with a color different from that of the characters.

The character attribute control code is a code for changing the attribute of character data. Accordingly, if it is desired to change the attribute of the characters to be transmitted, the attribute designation control code is first transmitted and then the character code is transmitted. Functions of normal display, underline, blinking, and reverse display can be designated by the attribute designation control code. Since the functions of underline, blinking, and reverse display are independently performed, all the attributes can be applied at a time.

Functions of the attribute designation control code are as follows:

Underline: An underline is displayed just below each character to be displayed.

Blinking: A displayed character is blinking. A previously displayed portion does not blink, but a presently displayed portion is blinking. The period of blinking is variably determined according to the specification of the receiver.

Reverse display: The colors of the foreground and background presently used in the receiver are changed from each other.

Normal display: All the attributes which have been designated are reset, and characters are displayed as a default attribute.

The display method control code is a control code for controlling the display mode of the characters to be transmitted. According to this code, on-display, off-display, receive/store, horizontal writing, and vertical writing can be designated.

On-display: The received character data is directly displayed on the screen (in a roll-up or roll-down mode), or the data stored by a control code of "receive/store" is displayed on the screen (in a pop-on mode).

Receive/store: The received character and control data are stored until the on-display is performed.

Horizontal writing: When the character codes successively received are displayed on the screen without intervention of the position movement control code, the position of a following character is moved to the right side of the presently displayed character.

Vertical writing: When the character codes successively received are displayed on the screen without intervention of the position movement control code, the position of a following character is moved to the lower position of the presently displayed character. The scroll control code is a code for scrolling up a predetermined portion of the caption display region, and is classified into a roll-up captioning of 2 to 5 rows and a roll-down captioning of 2 to 5 rows.

Roll-up of 2 to 5 rows: The 2 to 5 rows including the display position of the presently displayed character (the position of a cursor), which constitute a window, are scrolled up for one row. Among the selected rows of the window, the uppermost row disappears from the screen by scrolling, and the lowermost row is replaced by the characters decoded most recently. In using this scroll control code, a separate APDR (active position down return for the movement to the first character position of the lower row) code is not required, and all the characters outside the designated window are erased from the screen.

Roll-down of 2 to 5 rows: The 2 to 5 rows including the display position of the presently displayed character (the position of a cursor) are scrolled down for one row in a predetermined window. Among the selected rows of the window, the lowermost row disappears from the screen by scrolling, and the uppermost row is replaced by the characters decoded most recently. In using the scroll control code, a separate APUR (active position up return for the movement to the first character position of the upper row) code is not required, and all the characters outside the window are erased from the screen.

The position movement control code is a code for moving the display position of the character.

APF (active position forward): In case of the horizontal writing, the display position moves in the right direction for half the width of a Hangul character (the width of an English character). In case of the vertical writing, the display position moves in the lower direction for the height of a Hangul character.

APB (active position backward): In case of the horizontal writing, the display position moves in the left direction for half the width of a Hangul character (the width of an English character). In case of the vertical writing, the display position moves in the upper direction for the height of a Hangul character.

APDR (active position down return): In case of the horizontal writing, the display position moves to a first column position, i.e., to the very left character position of the just lower row. In case of the vertical writing, the display position moves to a first row position, i.e., to the uppermost character position of the just left column. The display position moves in the lower direction for the height of a Hangul character.

APUR (active position up return): In case of the horizontal writing, the display position moves to the first column position, i.e., to the very left character position of the just upper row. In case of the vertical writing, the display position moves to the first row position, i.e., to the uppermost character position of the just right column.

APF of 3 to 6 characters: In case of the horizontal writing, the APF is performed for the whole width of 3 to 6 English characters. In case of the vertical writing, the APF is performed for the whole height of 3 to 6 Hangul characters.

In exceptional cases of the position movement control as described above, the following processes are performed.

Specifically, if a character code is received without any control code related to position movement such as APDR, APUR, APB, roll-up of 2 to 5 rows, roll-down of 2 to 5 rows, etc., when the characters are displayed up to the right character position (the 18th column position) of the row in case of the horizontal writing, the character is displayed after the display position thereof moves to the very left character position (the first column position) of the row, without changing the row. At this time, if the received character code is a space code, it is disregarded until another character code which is not a space code is received. If a character code is received without any control code related to position movement such as APDR, APUR, PDB, roll-up of 2 to 5 rows, roll-down of 2 to 5 rows, etc., when the characters are displayed up to the very lower character position (the 10th row position) of the column in case of the vertical writing, the character is displayed after the display position thereof moves to the uppermost character position (the first row position) of the column, without changing the column. At this time, if the received character code is a space code, it is disregarded until another character code which is not a space code is received.

Transmission of a control code in accordance with a display mode is as follows:

The transmission of the control code in a pop-on mode is performed in the order of "receive/store+(another control code)+character row+(another control code)+ • • • +off-display+on-display+receive/store+(another control code)+character row+(another control code)+ • • • +off-display+on-display+ • • •". In order for a viewer to properly view the character information displayed on the screen in the pop-on mode, a proper delay time is necessarily required before the off-display control code is transmitted from the transmission part.

The transmission of the control code in a roll-up mode is performed in the order of "on-display+(another control code)+character row+(roll-up of 2 to 5 rows)+on-display +(another control code)+character row+(another control code)+character row +(roll-up of 2 to 5 rows)+ • • •". The external region of the window, which is determined every time when the control code for roll-up of 2 to 5 rows is received, should be erased with a transparent color.

The transmission of the control code in a roll-down mode is performed in the order of "on-display+(another control code)+character row+(another control code)+character row+(roll-down of 2 to 5 rows)+on-display+(another control code)+character row+(another control code)+character row+(roll-down of 2 to 5 rows)+ • • •". The external region of the window, which is determined every time when the control code for roll-down of 2 to 5 rows is received, should be erased with a transparent color.

The process of the control code in case of the vertical writing is as follows:

If a control code for vertical writing is decoded in the receiver, the display of the Hangul characters is changed to a column direction.

The vertical writing is mainly used in the event that a caption already exists in the broadcasting signal. The structure of the character cell in the vertical writing is not required to be the same as the character cells of the respective characters.

Figure 9C:
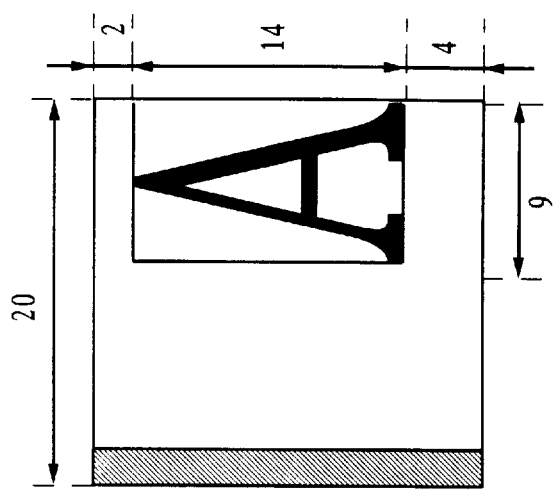
FIGS. 9A to 9C are views explaining character cells of Hangul, Chinese character, and English, and corresponding display cells arranged for vertical writing according to the present invention.
Figure 9B:
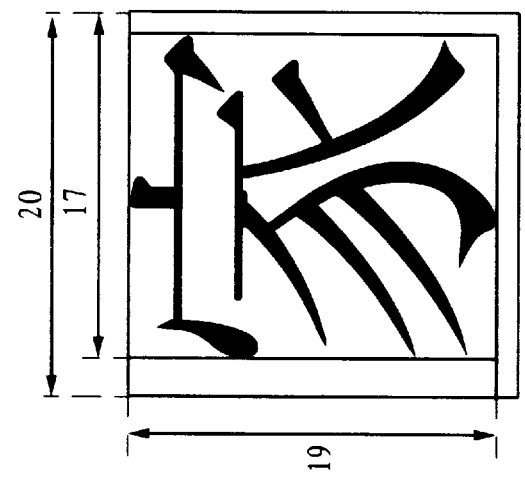
Figure 9A:
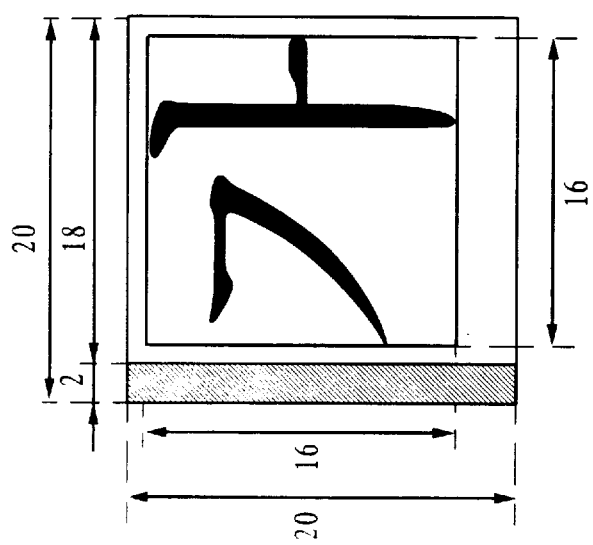

Referring to FIGS. 9A through 9C, in case of the vertical writing, the display cell's sizes of all kinds of characters coincide with one another regardless of the character cell's sizes of the respective characters. For example, the entire region occupied by an English character on the screen should coincide with that occupied by a Hangul character in consideration of the space between the characters in case of the vertical writing. In displaying the English character by the vertical writing, since the width of the English character cell corresponds to half the width of the Hangul character when font data is used in the vertical writing, the position of the English character cell of the corresponding display cell is determined to be included in a right half of the Hangul character cell as shown in FIG. 9C. In case of the vertical writing, since the underline designated by the underline designation is displayed on the right side of the character cell, the structure of the display cell will be different from that in case of the vertical writing, which may be determined in a different way in accordance with the view of the receiver. However, the display cell in case of the vertical writing should have enough size to include any of the character cells of all the characters.

In case of the vertical writing, it is comfortable to view the caption words when the column space is wider than the row space, and thus it is preferable that the structure of the character matrix in the caption display region is reconstructed. Specifically, in order to widen the column space in case of the vertical writing, the number of columns to be displayed is determined to be 16, and the number of characters to be displayed in a column is determined to be 10. Since all the characters have a character cell of the same size in case of the vertical writing, a 10×16 (row×column) character matrix is displayed over the entire screen. The caption region has the same width as that in case of the horizontal writing, and has a height smaller than or equal to that in case of the horizontal writing. Accordingly, the column space in the vertical writing is smaller than or equal to that in the horizontal writing, providing convenience in vertical reading. The column spaces should be identical to one another.

The default position of the receiver, when a specific position control code is not received in case of the vertical writing, is determined to be the first character position of the 16th column.

The direction of the active position of the cursor movement control code such as APDR, APUR, APF, APB, and N-APF in case of the vertical writing is determined based on the vertical column which corresponds to the character display direction. Specifically, it is defined such as down=left direction, up=right direction, forward=lower direction, and backward=upper direction. The APDR is defined as a control code for moving the display position to the position of the upper most character (a first row position) of the just left column, and the APUR is defined as a control code for moving the display position to the position of the uppermost character (a first row position) of the just right column.

In case of the vertical writing, the control code for roll-up of 2 to 5 columns is a code for displaying the contents of a window with scrolling of the same for one column in the right direction within the window including the right side columns of 2 to 5 including the present character display position (the position of the cursor). In operation, the very right column among the selected columns of the window disappears from the screen by scrolling, and the very left column is replaced by the character column decoded most recently. In using this control code, a separate APDR code for moving the display position to the uppermost character position of the left column in case of the vertical writing is not required, and all the regions outside the window of 2 to 5 columns are erased from the screen with a transparent color.

The control code for roll-down of 2 to 5 columns is a code for displaying the contents of a window with scrolling of the same for one column in the left direction within the window including the left side columns of 2 to 5 including the present character display position (the position of the cursor). In operation, the very left column among the selected columns of the window disappears from the screen by scrolling, and the very right column is replaced by the character column decoded most recently. In using this control code, a separate APUR code for moving the display position to the uppermost character position of the right column in case of the vertical writing is not required, and all the regions outside the window including 2 to 5 columns are erased from the screen with a transparent color.

Details of the control code for additional information will now be explained.

The additional information control code is transmitted in the unit of a page, and classified into a 'page start' control code and a 'page end' control code for page process. The 'page start' corresponds to 2-row roll-up of the caption words, and the 'page end' corresponds to 2-row roll-down of the caption words.

Page start: This represents the start of one page of the additional information, and the receiver starts to store the corresponding page when the page start control code is received. If the page start control code is not received at the start of a page, all data of this page will be disregarded.

Page end: This represents the end of one page of the additional information, and the receiver displays on the screen the data of the received page when the page end control code is received.

When the row change of the additional information is required, one code among the APDR, APUR, and column position designation control codes should be necessarily transmitted.

Before a page of the additional information data is displayed on the screen, the picture should be erased by a ground color of the page to be displayed, and thus the ground color is required to be transmitted for a page. The ground color code coming just after the 'page start' code identifies the ground color of the page, but if the ground color code does not come just after the 'page start' code, the ground color of the previous page is determined as the ground color of the present page.

The vertical writing is used just in the event that caption words for information such as news have already been displayed on the lower portion of the screen, and thus it is usually disregarded. Also, the roll-up of 3 to 5 rows and the roll-down of 3 to 5 rows are disregarded.

Discrimination and process of an effective code will be performed.

The receiver decodes the caption signal, discriminates and processes an effective code in the following order:

1) An input code is discriminated as the effective code only when D7 and D6 are the same.
2) Whether or not D17 is the same as $D0 \oplus D1 \oplus D2 \oplus D3 \oplus D4 \oplus D5 \oplus D6 \oplus D7 \oplus D8 \oplus D9 \oplus D10 \oplus D11 \oplus D12 \oplus D13 \oplus D14 \oplus D15 \oplus D16$ is checked, and if so, the input code is determined as the effective code.
3) If D5 and D6 are (0,1), and D14 and D15 are (0,0), the input code is determined as a control code. If D5 and D6 are (0,1), (1,0), or (1,1), and D14 and D15 are (0,1),(1,0), or (1,1), the input code is determined as a character code. If one pair of D5, D6, and D14, D15 are (0,0), and the other pair are (0,1), (1,0), or (1,1), the input code is determined as an error since it is not possible that the control code and the character code are simultaneously received.
4) If the input code is discriminated as the character code at step 3), it is checked whether or not D8 is the same as $D0 \oplus D1 \oplus D2 \oplus D3 \oplus D4 \oplus D5 \oplus D6 \oplus D7$. If so, it is determined that the discriminated code is an error.
5) If it is determined that the discriminated character code is not an error at step 4), it is identified whether or not the character code is defined by KSC 5601. If not, '?' or '■' is displayed, while if so, the corresponding character is displayed on the screen.
6) If the input code is discriminated as a control code at step 3), it is checked whether or not D0 is the same as $D1 \oplus D2 \oplus D3 \oplus D9$, and whether or not D4 is the same as $D1 \oplus D2 \oplus D11 \oplus D12$ in the LSWord. If it is checked that either of them is not the same, the control code is determined as an error.
7) If it is determined that the discriminated code is not an error at step 6), it is identified whether or not the control code is defined in the control code table of FIG. 5. If not, the control code is determined as an error, while if so, repeated transmission of the same LSWord and MSWord is waited for.
8) If the same LSWord and MSWord are repeatedly transmitted, application of the control code is performed.

The effective code discrimination and process as described above represents the preferred embodiment of the present invention, and any modification thereof will be possible. For example, the combination of the parity of the control code may be differently determined. Especially, various methods for preventing the error of the control code may be implemented.

The effect of the present invention as described above will now be explained in detail.

By the combination of the above-described control codes, the captioning has three modes available, including scroll of caption words, pop-on of caption words, and display of additional information.

If the roll-up and roll-down control codes are combined in the horizontal and vertical writings, the caption scroll is produced in four directions of upper, lower, left, and right sides.

Here, the caption roll display in the upper direction in case of the horizontal writing will be explained, while the movement in the lower direction will be omitted. A successive transmission code line includes "black ground—black ground—white character—white character—horizontal writing—horizontal writing—10th row—10th row—2nd column—2nd column—on-display—on-display—"da"—"um"—"un"—space—R-o-l-l—"pyo"—"shi"—"bup"—"eui"—space—"de"—"ei"—"ta"—space—"jun"—"song"—"ae"—". Here and hereafter, each character or wording in quotation marks represents transliteration of one Hangul character or wording. Accordingly, as shown in FIG. 10, white characters are displayed on a black ground of the screen. Thereafter, if another successive transmission code line of "2-row roll-up—2-row roll-up—"dae"—"han"—space—"ye"—"rul"—space—"bo"—"in"—space—"gut"—"ei"—da"—."follows, one character row is rolled up on the screen as shown in FIG. 11. In the same manner, if another successive transmission code line of "2-row roll-up—2-row roll-up—"to"—space—"han"—space—"jul"—"eul"—space—R-o-l-l-u-p—space—"shi"—"kin"—"da"". follows, the character row of the 9th row is erased, and the remaining rows are scrolled up for one row as shown in FIG. 12.

Meanwhile, the caption roll display in the left direction in case of the vertical writing will be explained, while the caption roll display in the right direction will be omitted. A successive transmission code line includes "off-display—off-display—black ground—black ground—white character—white character—vertical writing—vertical writing—2nd row—2nd row—15th column—15th column—on-display—on-display—"ei"—"bun"—"ae"—"nun"—space—"se"—"ro"—"seu"—"gi"—APDR—APDR—R-o-l-l—"pyo"—"gi"—"eui"—space—"ye"". Accordingly, as shown in FIG. 13, white characters are vertically displayed on a black ground of the screen. Thereafter, if another successive transmission code line of "2-column roll-up—2-column roll-up—APDR—APDR—"rul"—space—"bo"—"in"—space—"gut"—"ei"—"da"". follows, one character column is scrolled in the left direction of the screen as shown in FIG. 14.

If the accurate display position and the operating mode are not identified after the receiver operates, the received character code is displayed on the default position by a default display mode. If the horizontal/vertical writing designation code and the row/column position designation code are received during the default display, the presently displayed caption words are erased and the caption words are displayed in accordance with a new control code.

Figure 15:
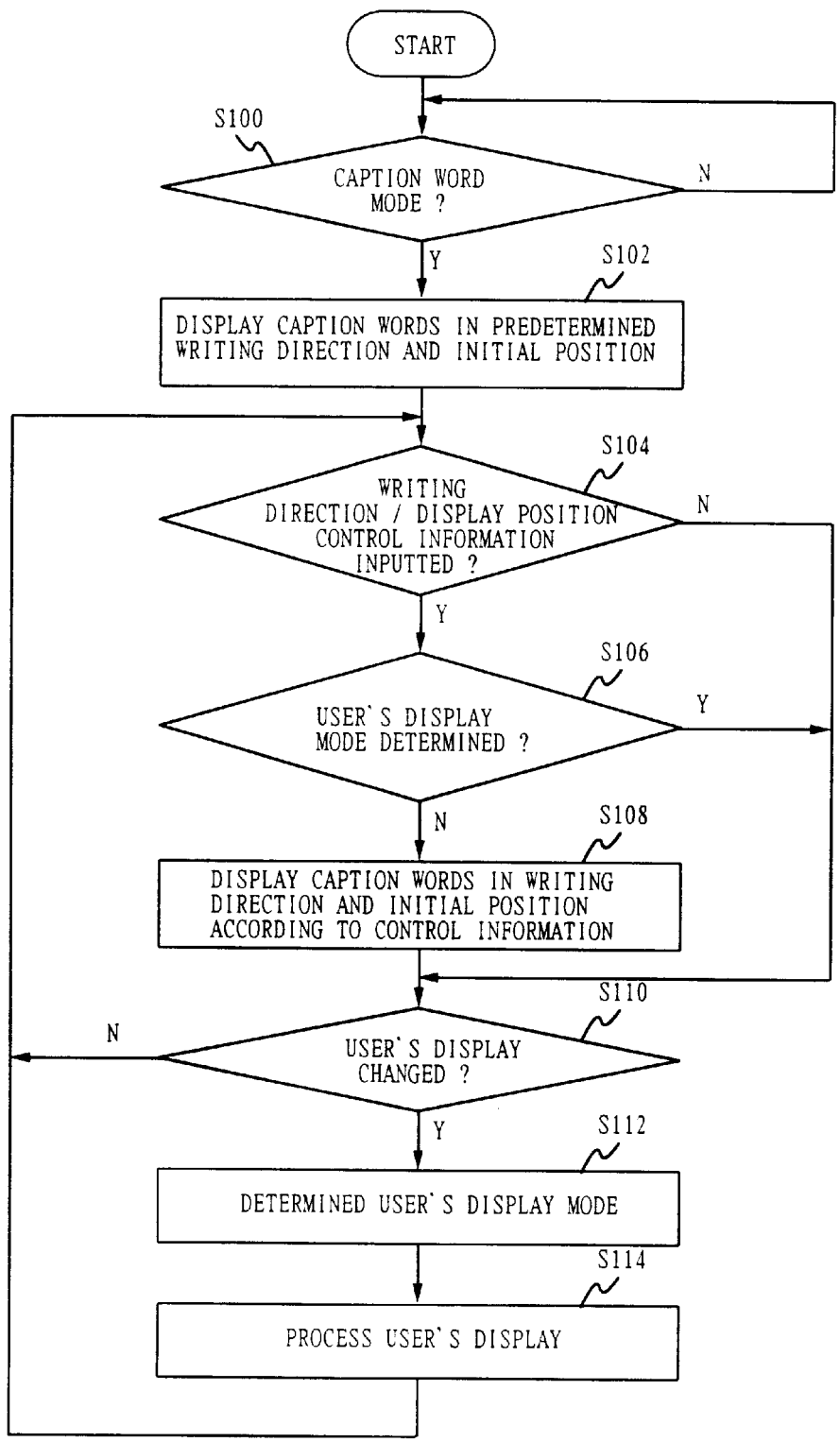
FIGS. 15 and 16 are flow charts explaining the caption displaying method according to a preferred embodiment of the present invention.

FIG. 15 is a flow chart explaining the display method of a closed-caption according to an embodiment of the present invention. Referring to FIG. 15, it is checked if the present mode is a caption word mode (step s100), and if so, the caption words are displayed on the screen in a predetermined writing direction and display position (step s102).

Thereafter, it is checked whether or not the control information on the writing direction and display position is inputted at intervals of 4 seconds (step s104), and if it is checked that the control information is inputted, it is checked whether or not a user's display mode is selected (step s106).

If it is checked that the user's display mode is not selected, the present writing direction and display position of the caption words displayed on the screen are changed to a predetermined writing direction and display position in response to the checked control information on the writing direction and display position (step s108).

If it is checked that the user's display mode is selected at step s106, or if the control information is not inputted at step s104, the input of a user's command for display change is checked (step s110), and if it is checked that the user's command for display change is not inputted, the input of the control information is checked again as at step s104.

If it is checked that the user's command for display change is inputted at step s110, the user's display change mode is selected (step s112), the display of the caption words is performed in response to the user's command for display change (step s114), and the input of the control information is checked again as at step s104.

The user's command for display change includes a command for changing the display position, a command for changing the writing direction, and a command for fine adjustment of the initial display position.

Figure 16:
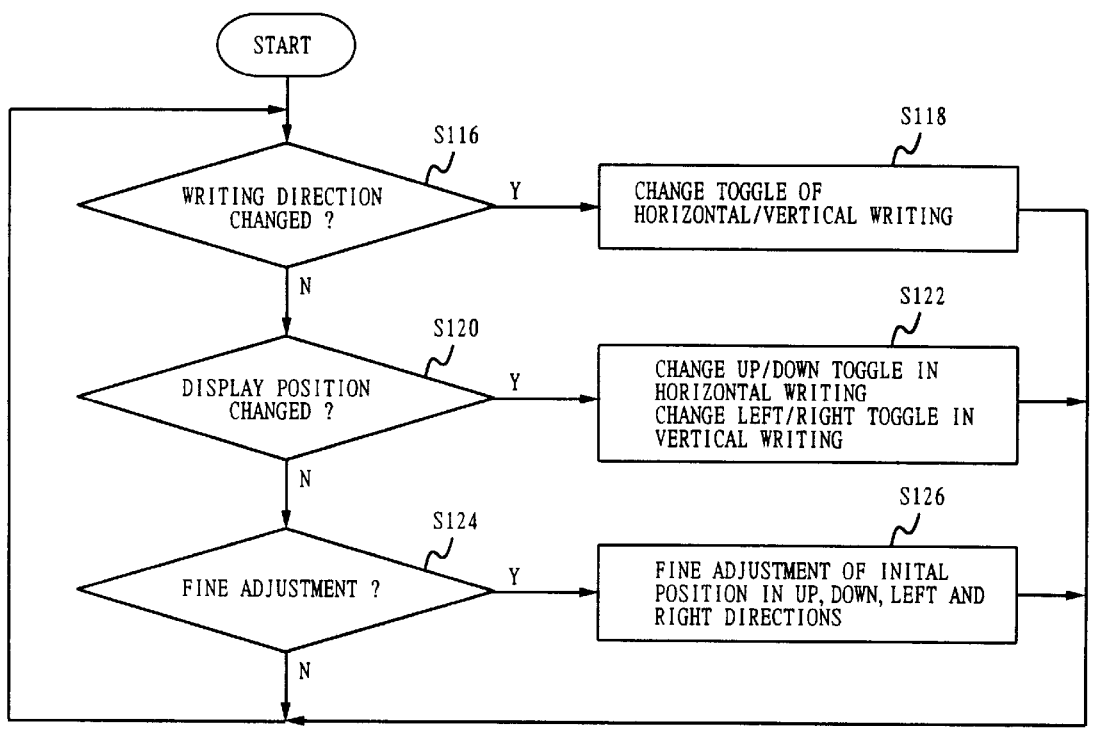

FIG. 16 is a flow chart explaining the display method of a closed-caption according to another embodiment of the present invention.

Referring to FIG. 16, it is first checked whether or not a command for changing the writing direction is inputted (step s116), and if not, it is checked whether or not a command for changing the display position is inputted (step s120). Thereafter, it is checked whether or not a command for fine adjustment of the display position is inputted (step s124).

Figure 17:
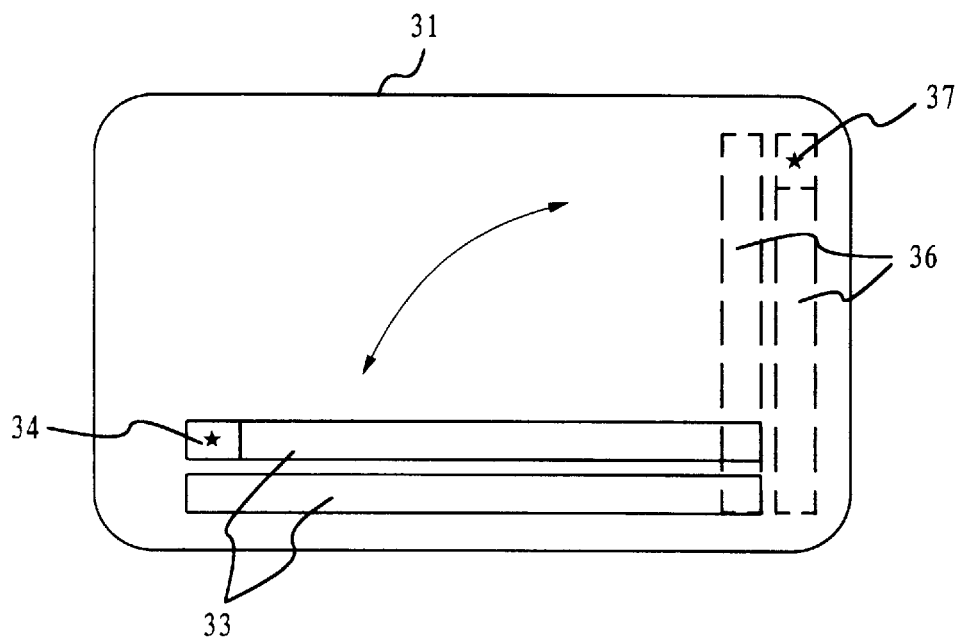
FIG. 17 is a view explaining the caption display position according to the present invention.

If the command for changing the writing direction is inputted at step s116, the present writing direction of the caption is changed from the horizontal writing to the vertical writing and vice versa as shown in FIG. 17 (step s118). A screen 31 has a horizontal writing caption display region 33, a horizontal writing initial position 34, a vertical writing caption display region 36, and a vertical writing initial position 37.

Figure 18:
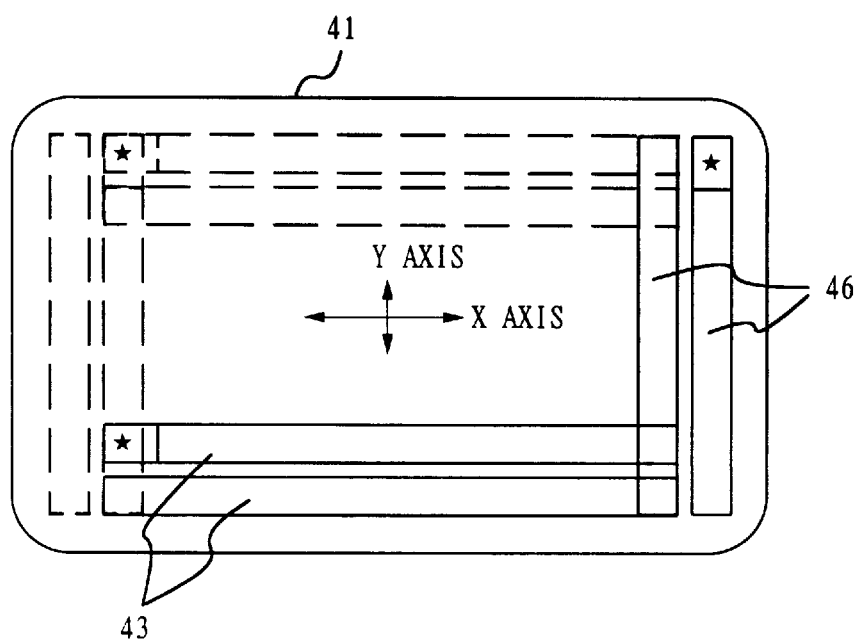
FIG. 18 is a view explaining the display state of a caption in accordance with the change of the display position according to the present invention.

If the command for changing the display position is inputted at step s120, the display position of the caption is changed from the upper region to the lower region of the screen and vice versa in the horizontal writing state, while the display position of the caption is changed from the left region to the right region of the screen and vice versa in the vertical writing state (step s122) as shown in FIG. 18. A screen 41 has a horizontal writing caption display region 43 and a vertical writing caption display region 46.

If the command for fine adjustment of the display position is inputted at step s124, the display position is to be finely adjusted in the upper, lower, left and right directions as shown in FIG. 18. Specifically, the fine adjustment of the display position is performed in such a manner that if a fine adjustment key is inputted in the upper, lower, left or right direction, the initial position of the display caption is slightly moved for a predetermined pixel in the corresponding key manipulating direction (step s126).

If the television channel is changed while the user utilizes the caption words or additional information displayed on the screen, the caption mode is released and only the television video signal is displayed on the screen even though a caption signal is transmitted through the changed television channel.

The broadcasting system is made in such a manner that symbol lines are properly arranged so that a control code for the display position is transmitted every 4 seconds since the control code is not identified when the receiver starts to operate. If the accurate position and the operating mode are not identified after the receiver operates, a normalized receiver displays the received character code on a default position. Thereafter, if a control code which is transmitted every 4 seconds is received, the receiver erases the presently displayed caption words, and then performs a caption display in accordance with a new control code.

In the event that a specific control code is not received at a point when the user selects the caption, the receiver maintains the attribute-release state, and immediately displays by the horizontal writing white characters on a black ground, starting from the first column position of the 10th row in the caption display region.

A changeover from the caption word mode to the additional information mode is performed at a point when the additional information mode is selected, or at a receiving point of the first page start control code after the selection of the additional information mode. If a specific control code is not received at a point when the user selects the additional information, the receiver releases the attribute of the character, and displays by the horizontal writing white characters on a black ground, starting from the first column position of the first now.

As described above, according to the present invention, the control information on the writing direction and display position of the closed-caption are transmitted at intervals of 4 seconds in a caption broadcasting transmission part, and the received character information is displayed on a default position of the screen until a specific control information is received in a caption broadcasting receiver. If the control information is received, the character information is displayed on the screen in the writing direction and display position determined by the control information. Also, since the user can command the writing direction, display position, and fine adjustment of the display position, the caption words can be displayed on a proper region of the screen which does not affect the atmosphere of the picture displayed on the screen as well as the writing direction of the caption words can be selected by the user.

While the present invention has been described and illustrated herein with reference to the preferred embodiments thereof, it will be understood by those skilled in the art that various changes in form and details may be made therein without departing from the spirit and scope of the invention.

What is claimed is:

1. A method of broadcasting a closed-caption signal which includes character information and control information for controlling a display of said character information, said closed-caption signal being encoded in a scanning line of each field of a television broadcasting signal and which does not affect said television broadcasting signal, said method comprising the steps of:

inserting data indicative of a writing direction and a display position of said character information into said caption signal as at least a part of said control information; and repeatedly transmitting said control information including said data indicative of said writing direction and said display position at predetermined intervals.

2. A closed-caption broadcasting method as claimed in claim 1, wherein said predetermined intervals are approximately 4 seconds each.

3. A method of displaying closed-caption information encoded in a scanning line of each field of a television video signal and which does not affect said television video signal, the method comprising the steps of:

displaying on a screen a caption in a predetermined writing direction and a predetermined display position when a closed-caption mode is selected;

checking whether control information indicative of a selected writing direction and display position of said caption is received at predetermined intervals; and changing a present writing direction and display position of said caption to said selected writing direction and display position in response to said control information on said selected writing direction and display position, and displaying said caption in said selected writing direction and display position on the screen.

4. A closed-caption displaying method as claimed in claim 3, wherein said predetermined writing direction corresponds to horizontal writing of said caption.

5. A closed-caption displaying method as claimed in claim 3, wherein said predetermined display position is a position of a first column of a 10th row in a caption display region of said screen in a caption word mode.

6. A closed-caption displaying method as claimed in claim 3, wherein said predetermined display position is a position of a first column of a first row in a caption display region of said screen in an additional information mode.

7. A closed-caption displaying method as claimed in claim 3, wherein said selected writing direction is one of horizontal and vertical and said selected display position is one of an upper region and a lower region of said screen if said selected writing direction is horizontal and is one of a left region and a right region of said screen if said selected writing direction is vertical.

8. A method of displaying closed-caption information enclosed in a scanning line of each field of a television video signal and which does not affect said television video signal, the method comprising the steps of;

checking an input of a command for changing a display position of caption words including said closed-caption information; and alternately changing said display position of said caption words between a first initial position and a second initial position each time said command for changing said display position of said caption words is inputted, to display said caption words in a changed display position.

9. A closed-caption displaying method as claimed in claim 8, wherein said first initial position corresponds to a lower end portion of a caption display region and said second initial position corresponds to an upper end portion of said caption display region in a horizontal writing of said caption words.

10. A closed-caption displaying method as claimed in claim 8, wherein said first initial position corresponds to a right side portion of a caption display region and said second initial position corresponds to a left side portion of said caption display region in a vertical writing of said caption words.

11. A method of displaying closed-caption information encoded in a scanning line of each field of a television video signal and which does not affect the television video signal, the method comprising the steps of:

checking an input of a command for changing a writing direction of caption words including said closed-caption information; and alternately changing said writing direction of said caption words between a first writing direction and a second writing direction each time said command for changing said writing direction of said caption words is inputted, to display said caption words in a changed writing direction.

12. A closed-caption displaying method as claimed in claim 11, wherein said first writing direction corresponds to a horizontal writing of said caption words and said second writing direction corresponds to a vertical writing of said caption words.

13. A method of displaying closed-caption information encoded in a scanning line of each field of a television video signal which does not affect said television video signal, the method comprising the steps of:

checking an input of a command for fine adjustment of a display position of caption words including said closed-caption information; and finely adjusting an initial display position of said caption words in one of an upper, lower, left and right direction each time said fine adjustment command is inputted, to display said caption words in an adjusted display position.

14. A method of displaying closed-caption information encoded in a scanning line of each field of a television video signal and which does not affect said television video signal, the method comprising the steps of:

displaying on a screen a caption in a predetermined writing direction and a predetermined display position when a closed-caption mode is selected;

checking whether control information indicative of a selected writing direction and display position of said caption is received at predetermined intervals;

checking whether a user's display mode is selected if said control information on said selected writing direction and display position is received;

changing a present writing direction and display position of said caption to said selected writing direction and display position in response to said control information on said selected writing direction and display position if said user's display mode is not selected;

checking an input of a user's command for display change if said user's display mode is selected or if said control information is not received, and again checking whether said control information is received if said user's command for display change is not received;

selecting said user's display mode if said user's command for display change is received; and processing said display of said caption in response to said receiving user's command for display change if said user's display mode is selected, and again checking if said control information is received.

15. A closed-caption displaying method as claimed in claim 14, wherein said user's command for display change includes at least one of a command for display position change, a command for writing direction change, and a command for fine adjustment of an initial display position of said caption.

16. A closed-caption displaying method as claimed in claim 14, wherein said selected writing direction is one of horizontal and vertical and said selected display position is one of an upper region and a lower region of said screen if said selected writing direction is horizontal and is one of a left region and a right region of said screen if said selected writing direction is vertical.

17. A method of displaying closed-caption information encoded in a television video signal and which does not affect said television video signal, the method comprising the steps of:
   displaying said closed-caption information in a predetermined writing direction and at a predetermined display position;
   determining whether a first command for changing said writing direction is received and toggling said writing direction between said predetermined writing direction and a second writing direction each time said first command is received; and
   determining whether a second command for changing said display position is received and toggling said display position between said predetermined display position and a second display position each time said second command is received.

18. A closed-caption displaying method as claimed in claim 17, wherein said writing direction toggles between a horizontal direction and a vertical direction, and said display position toggles between an upper region and a lower region of a display if said writing direction is horizontal and toggles between a left region and a right region of said display if said writing direction is vertical.

19. A closed-caption displaying method as claimed in claim 18, further comprising the step of determining whether a third command for fine adjustment of said display position is received and moving said display position by a predetermined amount in a designated direction based upon said third command.

20. A closed-caption displaying method as claimed in claim 17, further comprising the step of determining whether a third command for fine adjustment of said display position is received and moving said display position by a predetermined amount in a designated direction based upon said third command.

21. A receiver to receive a television signal including a video signal encoded with a caption signal indicative of a caption, the receiver comprising:
   a receptor for receiving the television signal;
   a video signal processing unit to luminance and chrominance process the television signal;
   a data extractor to convert the television signal into a digital signal;
   a sync separator to separate vertical and horizontal sync signals from the television signal;
   a command input section to receive command inputs from a user, including a first command for changing a writing direction of the caption;
   a storage device to store character information of a bit-map type; and
   a caption processing unit to extract the caption signal from the digital signal based upon the output from the sync separator, to discriminate the caption signal as being one of a character code containing caption character data and a control code for controlling display of the caption character data based on designated values of selected bits of the character code and control code, to read out the character information from the storage device based upon the character code, to alter an appearance of the caption on a display based upon the discrimination of the control code, and changing the writing direction of the caption upon receipt of said first command.

22. A receiver as claimed in claim 21, wherein:
   said command input section receives a second command for changing a display position of the caption; and
   said caption processing unit changes the display position of the caption upon receipt of said second command.

23. A receiver as claimed in claim 22, wherein the writing direction is one of horizontal and vertical and the display position is one of an upper region and a lower region of a display if the writing direction is horizontal and is one of a left region and a right region of the display if the writing direction is vertical.

24. A receiver as claimed in claim 22, wherein the first command toggles the writing direction between a horizontal direction and a vertical direction, and the second command toggles the display position between an upper region and a lower region of the display if the writing direction is horizontal and toggles between a left region and a right region of the display if the writing direction is vertical.

25. A receiver as claimed in claim 24, wherein:
   said command input section receives a third command for fine adjustment of the display position; and
   said caption processing unit changing the display position by a predetermined amount in a designated direction based upon said third command.

26. A receiver as claimed in claim 22, wherein:
   said command input section receives a third command for fine adjustment of the display position; and
   said caption processing unit changing the display position by a predetermined amount in a designated direction based upon said third command.

27. A receiver as claimed in claim 21, wherein the writing direction is one of horizontal and vertical and the display position is one of an upper region and a lower region of a display if the writing direction is horizontal and is one of a left region and a right region of the display if the writing direction is vertical.

* * * * *

UNITED STATES PATENT AND TRADEMARK OFFICE
CERTIFICATE OF CORRECTION

PATENT NO.:   6,130,722
DATED     :   October 10, 2000
INVENTOR(S):  Bae et al.

It is certified that [an/error[s]] appears in the above-identified patent and that said Letters Patent is hereby corrected as shown below:

Column 22, line 54, change "display" to --screen--.

Signed and Sealed this

Twenty-ninth Day of May, 2001

*Attest:*

NICHOLAS P. GODICI

*Attesting Officer*     *Acting Director of the United States Patent and Trademark Office*